United States Patent
Nishinaka

(10) Patent No.: US 10,201,844 B2
(45) Date of Patent: Feb. 12, 2019

(54) APPARATUS AND METHOD FOR MANUFACTURING LAMINATED IRON CORE

(71) Applicant: KURODA PRECISION INDUSTRIES LTD., Kanagawa (JP)

(72) Inventor: Koichi Nishinaka, Kanagawa (JP)

(73) Assignee: KURODA PRECISION INDUSTRIES LTD., Kanagawa (JP)

(*) Notice: Subject to any disclaimer, the term of this patent is extended or adjusted under 35 U.S.C. 154(b) by 107 days.

(21) Appl. No.: 15/509,978

(22) PCT Filed: Nov. 7, 2014

(86) PCT No.: PCT/JP2014/005613
§ 371 (c)(1),
(2) Date: Mar. 9, 2017

(87) PCT Pub. No.: WO2016/071943
PCT Pub. Date: May 12, 2016

(65) Prior Publication Data
US 2017/0297078 A1    Oct. 19, 2017

(51) Int. Cl.
*B21D 28/14* (2006.01)
*B05D 1/26* (2006.01)
(Continued)

(52) U.S. Cl.
CPC .............. *B21D 28/145* (2013.01); *B05C 5/02* (2013.01); *B05C 5/0212* (2013.01);
(Continued)

(58) Field of Classification Search
CPC ......... B21D 28/145; B05C 5/02; B05C 5/021; B05C 11/1021; B05C 11/1044;
(Continued)

(56) References Cited

FOREIGN PATENT DOCUMENTS

JP    62183582 U    11/1987
JP      459302 A     2/1992
(Continued)

OTHER PUBLICATIONS

Translation of JP 2003-033711 A, published Feb. 4, 2003, Koatekku KK (Coretec) (Year: 2003).*
(Continued)

*Primary Examiner* — George R Koch
(74) *Attorney, Agent, or Firm* — Dority & Manning, P.A.

(57) ABSTRACT

In manufacturing a laminated iron core by laminating and bonding iron core laminates blanked from a sheet steel strip into a prescribed profile, the adhesive agent can be applied to the iron core laminates in a stable manner without regard to the arrangement and the number of the application spots on each iron core laminate. The metallic die machine (1) is provided with an adhesive agent application unit (12) configured to apply an adhesive agent to a prescribed area of the sheet steel strip (W) corresponding to the iron core laminates (2), and the adhesive agent application unit is provided with a casing (44) defining a plurality of adhesive agent storage chambers (55-57) for storing the adhesive agent before the adhesive agent is applied to the prescribed area. The casing is provided with a plurality of ejection orifices (H1 to H3) each communicating with a corresponding one of the adhesive agent storage chambers and configured to eject the adhesive agent.

13 Claims, 17 Drawing Sheets

(51) Int. Cl.
  *B05C 5/02* (2006.01)
  *B05C 11/10* (2006.01)
  *H01F 27/245* (2006.01)
  *H02K 15/02* (2006.01)
  *B05D 7/24* (2006.01)
  *H01F 41/02* (2006.01)

(52) U.S. Cl.
  CPC ........ *B05C 5/0279* (2013.01); *B05C 11/1021* (2013.01); *B05C 11/1044* (2013.01); *B05D 1/26* (2013.01); *H01F 27/245* (2013.01); *H02K 15/02* (2013.01); *B05D 7/24* (2013.01); *H01F 41/02* (2013.01); *H01F 41/0233* (2013.01)

(58) Field of Classification Search
  CPC ........... B05D 1/26; B05D 7/24; H01F 27/245; H01F 41/02; H01F 41/0233; H02K 15/02
  See application file for complete search history.

(56) References Cited

FOREIGN PATENT DOCUMENTS

| | | |
|---|---|---|
| JP | 2001025218 | 1/2001 |
| JP | 2001321850 A | 11/2001 |
| JP | 2003033711 A | 2/2003 |
| JP | 2005538847 A | 12/2005 |

OTHER PUBLICATIONS

Translation of JP 2005-538847 A, published Dec. 22, 2005, Windmoeller & Hoelscher (Year: 2005).*
Translation of JP H04-059302A, published Feb. 26, 1992, Hashimoto Denko Co, Ltd. (Year: 1992).*
International Search Report, PCT/JP2014/005613, dated Feb. 10, 2015, 4 pages.

* cited by examiner

APPARATUS AND METHOD FOR MANUFACTURING LAMINATED IRON CORE

CROSS REFERENCE TO RELATED APPLICATIONS

This application is the U.S. National Stage entry of International Application Number PCT/JP2014/005613 filed under the Patent Cooperation Treaty having a filing date of Nov. 7, 2014, the disclosure of which is hereby incorporated by reference herein in its entirety for all purposes.

TECHNICAL FIELD

The present invention relates to apparatus and a method for manufacturing a laminated iron core used for a stator or a rotor of an electric motor or an electric generator, and in particular to apparatus and a method for manufacturing a laminated iron core formed by laminating and bonding iron core laminates blanked from a strip of sheet steel strip into a prescribed profile.

BACKGROUND ART

Conventionally, a laminated iron core was typically manufactured by processing a sheet steel strip made of electromagnetic steel by using a progressive metallic die machine. In a progressive metallic die machine, locating holes, slots and internal teeth are punched out in a sheet metal strip in a sequential manner so as to form various parts of each iron core laminate, and a prescribed number of blanked iron core laminates are stacked and bonded to one other. The bonding of iron core laminates may be accomplished by various methods such as the lamination crimping method in which irregularities for crimping purpose are formed in each iron core laminate, and the iron core laminates are crimped to one another by compressing together the iron core laminates as they are stacked one over another, and the lamination welding method in which iron core laminates are stacked, and then laser welded to one another. However, as these methods tend to cause impairment of the magnetic property of the bonded parts, the lamination bonding method is widely selected. In the lamination bonding method, an adhesive agent is applied to a surface of a sheet metal strip, and the iron core laminates that are blanked from the sheet metal strip are bonded together as they are stacked up in a progressive metallic die machine. See Patent Documents 1 and 2.

A known adhesive agent supply unit that is used for implementing the lamination bonding method includes a cylinder retained by a lower metallic die assembly in a press forming machine in a vertically slidable manner, a plurality of adhesive agent transferring nozzles provided at the free end of the cylinder, a storage chamber defined in a free end part of the cylinder to store the adhesive agent supplied via an adhesive agent supply passage at a prescribed pressure, and a piston slidably received in the cylinder for pushing out the adhesive agent in the storage chamber toward the transferring nozzles. As the upper metallic die assembly of the press forming machine is lowered, and the free end of the cylinder is pushed down by the upper metallic die assembly, the piston is caused to move upward relative to the cylinder with the result that the adhesive agent is ejected from the transferring nozzles onto the iron core laminate. See Patent Document 3.

PRIOR ART DOCUMENT(S)

Patent Document(s)

Patent Document 1: JP2001-25218A
Patent Document 2: JP2001-321850A
Patent Document 3: JP2003-33711A

SUMMARY OF THE INVENTION

Task to be Accomplished by the Invention

According to the prior art disclosed in Patent Document 3, the transferring nozzles for ejecting the adhesive agent are positioned so as to apply the adhesive agent only to positions on radial arm sections of each iron core laminate (or positions rotationally symmetric or otherwise symmetric around the center of the iron core laminate), and the number (three) of the transferring nozzles (application spots for the adhesive agent) is limited. Also, according to this prior art, when the adhesive agent is applied to a larger area (or the number of application spots is increased) or when the application spots on each iron core laminate are arranged in a relatively complex pattern (such as when the application spots are not arranged in a symmetric pattern), the adhesive agent may not be ejected from the nozzles in a stable manner.

It is preferable to be able to vary the application amounts of the adhesive agent to be applied in different areas of the iron core laminates or interrupt the application of the adhesive agent to a part of the application area depending on the shape and the size of the laminated iron core to be manufactured, but the prior art does not contain any disclosure pertaining to such possibilities.

The present invention was made in view of such problems of the prior art, and has a primary object to provide, in manufacturing a laminated iron core by laminating and bonding iron core laminates blanked from a sheet steel strip into a prescribed profile, apparatus and a method for manufacturing a laminated iron core that allow the adhesive agent to be applied to the iron core laminates in a stable manner without regard to the arrangement and the number of the application spots on each iron core laminate.

Means for Accomplishing the Task

According to a first aspect of the present invention, apparatus (1) for manufacturing a laminated iron core formed by laminating and bonding a plurality of iron core laminates (2) that are each formed by blanking a sheet steel strip (W) into a prescribed shape, comprises: an upper metallic die assembly (3) and a lower metallic die assembly (4) opposing each other so as to blank the iron core laminates from the sheet steel strip that is conveyed in an intermittent manner; and an adhesive agent application unit (12) configured to apply an adhesive agent to a prescribed area of the sheet steel strip corresponding to the iron core laminates; wherein the adhesive agent application unit is provided with a casing (44) defining a plurality of adhesive agent storage chambers (55-57, 255-257, 355-357, 455-457) for storing the adhesive agent before the adhesive agent is applied to the prescribed area; and wherein the casing is provided with a plurality of ejection orifices (H1 to H3) each communicating with a corresponding one of the adhesive agent storage chambers and configured to eject the adhesive agent.

In the apparatus for manufacturing a laminated iron core based on the first aspect, each of the ejection orifices is associated with and communicate with a corresponding one of the adhesive agent storage chambers so that the flow rate of the adhesive agent ejected from the ejection orifices associated with each of the adhesive agent storage chambers (or the pressure of the adhesive agent in each adhesive agent storage chamber) can be individually adjusted without any difficulty. Therefore, the adhesive agent can be applied to the iron core laminates in a stable manner without regard to the arrangement and the number of the application spots (or the arrangement and the number of the ejection orifices) on each iron core laminate.

According to a second aspect of the present invention, the apparatus further comprises a control unit (85) for controlling supply of the adhesive agent to the adhesive agent storage chambers individually.

In the apparatus for manufacturing a laminated iron core based on the second aspect, by allowing the supply of the adhesive agent to the adhesive agent storage chambers to be controlled individually, a suitable amount of the adhesive agent can be applied from each group of the ejection orifices associated with the corresponding adhesive agent storage chamber depending on the size of the application area on each iron core laminate and the required bonding strength without any difficulty, in particular, when the ejection orifice groups are associated with different area parts forming the prescribed area (application area), a suitable amount of the adhesive agent can be applied to each area part.

According to a third aspect of the present invention, in conjunction with the first or second aspect, the control unit is configured to interrupt supply of the adhesive agent to at least one (256, 257, 356) of the adhesive agent storage chambers (255-257, 355-357) when applying the adhesive agent to a prescribed area corresponding to at least one of the iron core laminates that form the laminated iron core.

In the apparatus for manufacturing a laminated iron core based on the third aspect, as the application of the adhesive agent can be interrupted for each of the ejection orifice group associated with a corresponding one of the adhesive agent storage chambers the application of the adhesive agent can be readily switched from one pattern to another depending on the particular need (or avoiding any unnecessary application of the adhesive agent). In particular, when the ejection orifice groups are defined so as to correspond to different application area parts of the entire application area, the application of the adhesive agent can be readily performed and omitted for each application area part.

According to a fourth aspect of the present invention, in conjunction with the third aspect, the laminated iron core is formed by a plurality of kinds of iron core laminates (2A to 2C) having different profiles, and the control unit is configured to interrupt supply of the adhesive agent to at least one of the adhesive agent storage chambers such that when the iron core laminates corresponding to the prescribed area are changed from one kind to another, the adhesive agent is applied only to a area where the iron core laminate of the one kind overlaps with the iron core laminate of the other kind.

In the apparatus for manufacturing a laminated iron core based on the fourth aspect, even when the laminated iron core is formed by a plurality of kinds of iron core laminates having different profiles, the application of the adhesive agent to unnecessary area parts (areas where the adjoining iron core laminates do not overlap with each other in the laminated iron core) can be avoided so that the smearing of the tools for the punch work (such as punches and dies) can be prevented.

According to a fifth aspect of the present invention, in conjunction with the third aspect, the laminated iron core is formed by iron core laminates each including a plurality of segments (311 to 313), and the control unit is configured to interrupt supply of the adhesive agent to at least one of the adhesive agent storage chambers such that when the iron core laminates corresponding to the prescribed area are changed from one kind to another, the adhesive agent is applied to a area where the iron core laminate of the one kind overlaps with the iron core laminate of the other kind.

In the apparatus for manufacturing a laminated iron core based on the fifth aspect, even when the iron core consists of a plurality of kinds of iron core laminates that may form different segments of the iron core laminates, the application of the adhesive agent to unnecessary area parts can be avoided so that the smearing of the tools for the punch work can be prevented.

According to a sixth aspect of the present invention, in conjunction with any of the first to fifth aspects, ejection orifices communicating with different ones of the adhesive agent storage chambers have mutually different diameters.

In the apparatus for manufacturing a laminated iron core based on the sixth aspect, a suitable (different) amount of the adhesive agent can be applied from each of the ejection orifice groups.

According to a seventh aspect of the present invention, in conjunction with any of the first to sixth aspects, the adhesive agent in one of the adhesive agent storage chambers has a pressure which is different from that of the adhesive agent in a different one of the adhesive agent storage chamber.

In the apparatus for manufacturing a laminated iron core based on the seventh aspect, a suitable (different) amount of the adhesive agent can be applied from each of the ejection orifice groups.

According to an eighth aspect of the present invention, in conjunction with any of the first to fifth aspects, the laminated iron core is formed by iron core laminates including an annular or a circular section, and the adhesive agent storage chambers include at least a first storage chamber (55, 56, 355, 356) having an annular shape in plan view, and a second storage chamber (56, 57, 356, 357) having a larger annular shape in plan view and arranged concentrically to the first storage chamber.

In the apparatus for manufacturing a laminated iron core based on the eighth aspect, when the laminated iron core is formed by iron core laminates including a substantially annular or a substantially circular part, a suitable amount of the adhesive agent can be applied to each of the inner peripheral application area part corresponding to the first adhesive agent storage chamber and the outer peripheral application area part corresponding to the second adhesive agent storage chamber in a stable manner.

According to a ninth aspect of the present invention, in conjunction with the eighth aspect, an amount of application from each ejection orifice communicating with the second storage chamber (57) is greater than an amount of application from each ejection orifice communicating with the first storage chamber (55, 56).

In the apparatus for manufacturing a laminated iron core based on the ninth aspect, for manufacturing a laminated iron core formed by iron core laminates each including a substantially annular or circular shape, a larger amount of the adhesive agent can be applied to an outer peripheral area corresponding to the second storage chamber and involving a comparatively large application area than an inner peripheral area corresponding to the first storage chamber so that the bonding strength may be distributed evenly over the entire surfaces of the iron core laminates.

According to a tenth aspect of the present invention, in conjunction with the ninth aspect, a diameter of each ejection orifice communicating with the second storage chamber (57) is greater than a diameter of each ejection orifice communicating with the first storage chamber (55, 56).

In the apparatus for manufacturing a laminated iron core based on the tenth aspect, for manufacturing a laminated iron core formed by iron core laminates each including a substantially annular or circular shape, a larger amount of the adhesive agent can be applied to an outer peripheral area involving a comparatively large application area than an inner peripheral area so that an appropriate amount of the adhesive agent can be applied by using a simple structure.

According to an eleventh aspect of the present invention, in conjunction with the ninth aspect, a pressure of the adhesive agent in the second storage chamber (57) is greater than a pressure of the adhesive agent in the first storage chamber (55, 56).

In the apparatus for manufacturing a laminated iron core based on the eleventh aspect, for manufacturing a laminated iron core formed by iron core laminates each including a substantially annular or circular shape, a larger amount of the adhesive agent can be applied to an outer peripheral area involving a comparatively large application area than an inner peripheral area so that an appropriate amount of the adhesive agent can be applied by using a simple structure.

According to a twelfth aspect of the present invention, in conjunction with any one of the eighth to eleventh aspects, at least one of the first and second storage chambers is provided with a plurality of injection orifices (K1 to K3) for injecting the adhesive agent thereinto, and the apparatus further comprises a manifold (48A to 48C) including a plurality of branch passages connected to the respective injection orifices.

In the apparatus for manufacturing a laminated iron core based on the twelfth aspect, because the adhesive agent is injected into (at least one of) the first storage chamber and the second storage chamber via the plural injection orifices, the pressure of the adhesive agent in the adhesive agent storage chambers can be made even so that an appropriate amount of the adhesive agent can be applied to the application area in a stable manner.

According to a thirteenth aspect of the present invention, in conjunction with the twelfth aspect, the casing is annular in plan view, and the manifold is positioned centrally with respect to the casing in plan view.

In the apparatus for manufacturing a laminated iron core based on the thirteenth aspect, the pressure of the adhesive agent in the first or second adhesive storage chamber can be made even owing to the manifold while the size of the adhesive agent application unit is prevented from being increased owing to the presence of the manifold.

According to a fourteenth aspect of the present invention, in conjunction with the thirteenth aspect, the manifold is provided for each of the first and second storage chambers, and the two manifolds are positioned one above the other.

In the apparatus for manufacturing a laminated iron core based on the fourteenth aspect, the pressure of the adhesive agent in the first or second adhesive storage chamber can be made even owing to the manifolds while the size of the adhesive agent application unit is prevented from being increased owing to the presence of the plural manifolds.

According to a fifteenth aspect of the present invention, a method is provided for manufacturing a laminated iron core formed by laminating and bonding a plurality of iron core laminates that are each formed by punching a sheet steel strip, and blanking the sheet steel strip into a prescribed shape, comprising the steps of: punching a sheet steel strip that is conveyed in an intermittent manner and blanking iron core laminates from the sheet metal strip; and applying an adhesive agent to designated areas of the sheet steel strip corresponding to the iron core laminates during the punching and blanking steps; wherein the adhesive agent is stored in a plurality of adhesive agent storage chambers before the adhesive agent is ejected from a plurality of ejection orifices toward the designated areas during the adhesive agent applying step; and wherein each of the ejection orifices is associated with one of the adhesive agent storage chambers such that the adhesive agent ejected from each orifice is supplied from the associated adhesive agent storage chamber.

Effect of the Invention

Thus, according to the present invention, in manufacturing a laminated iron core by laminating and bonding iron core laminates blanked from a sheet steel strip into a prescribed profile, the adhesive agent can be applied to the iron core laminates in a stable manner without regard to the arrangement and the number of the application spots on each iron core laminate.

BRIEF DESCRIPTION OF THE DRAWING(S)

DESCRIPTION OF THE PREFERRED EMBODIMENT(S)

Preferred embodiments of the present invention are described in the following with reference to the appended drawings.

First Embodiment

Figure 1:
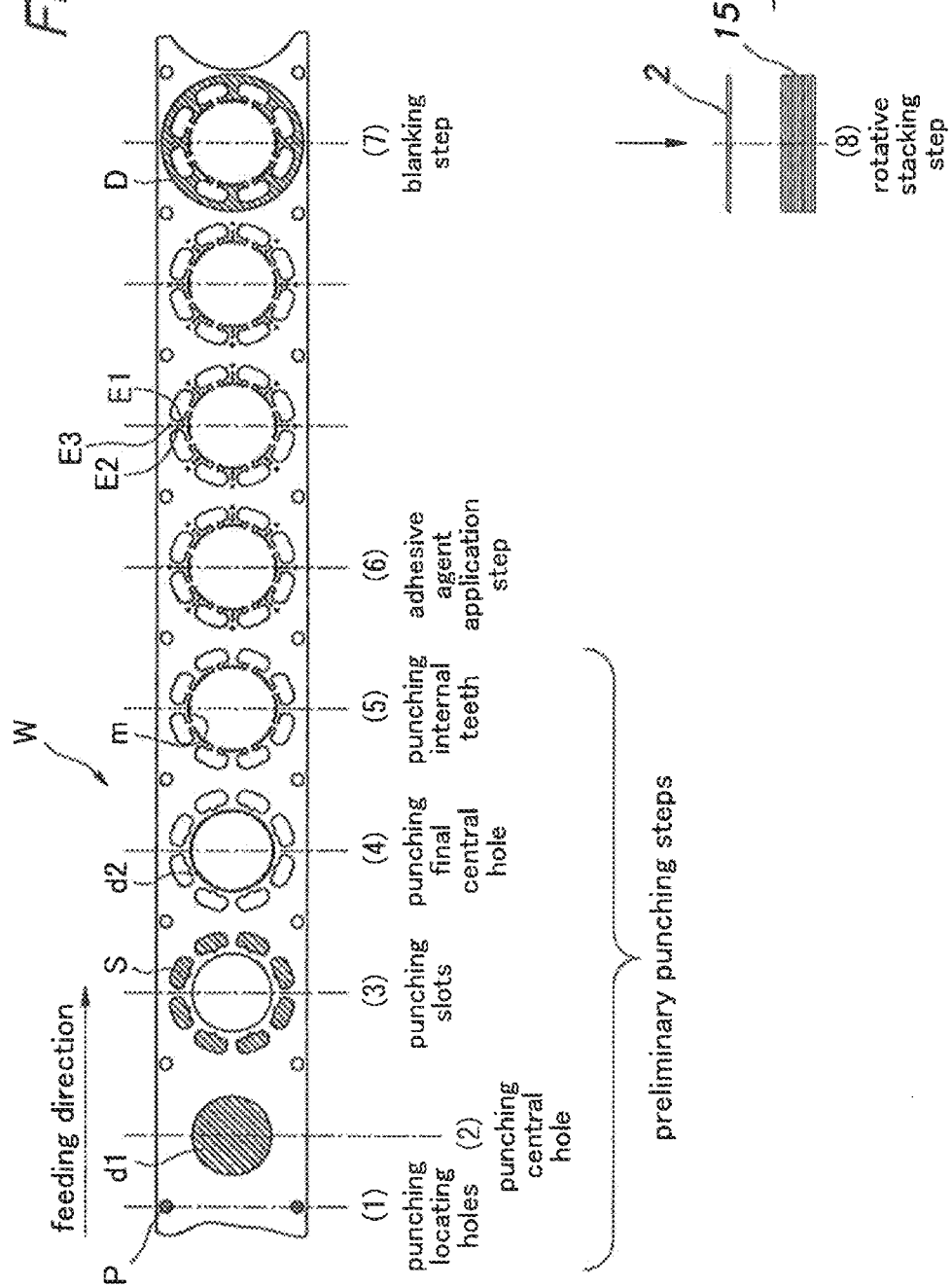
FIG. 1 is a diagram showing a strip layout associated with a progressive metallic die machine given as a first embodiment of the present invention.
Figure 2:
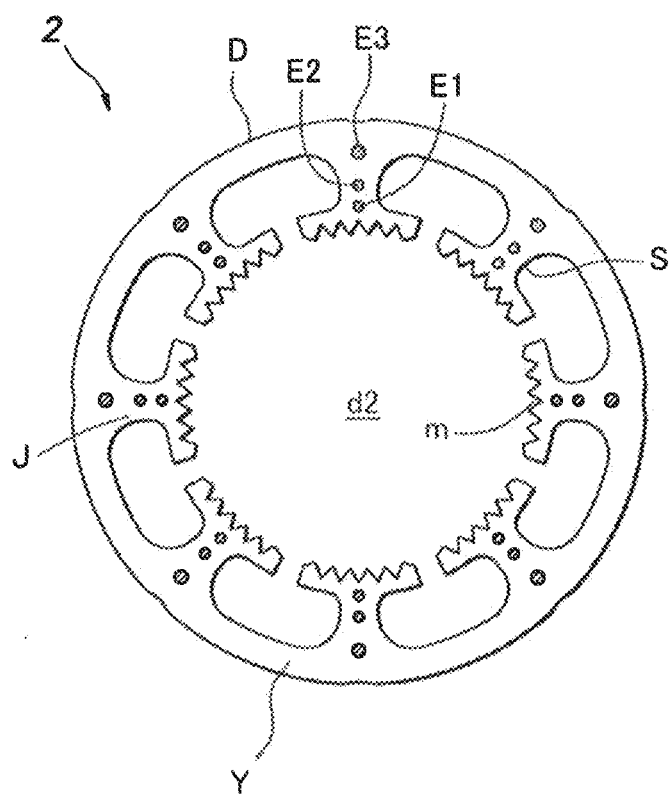
FIG. 2 is a plan view of a blanked iron core laminate.
Figure 3:
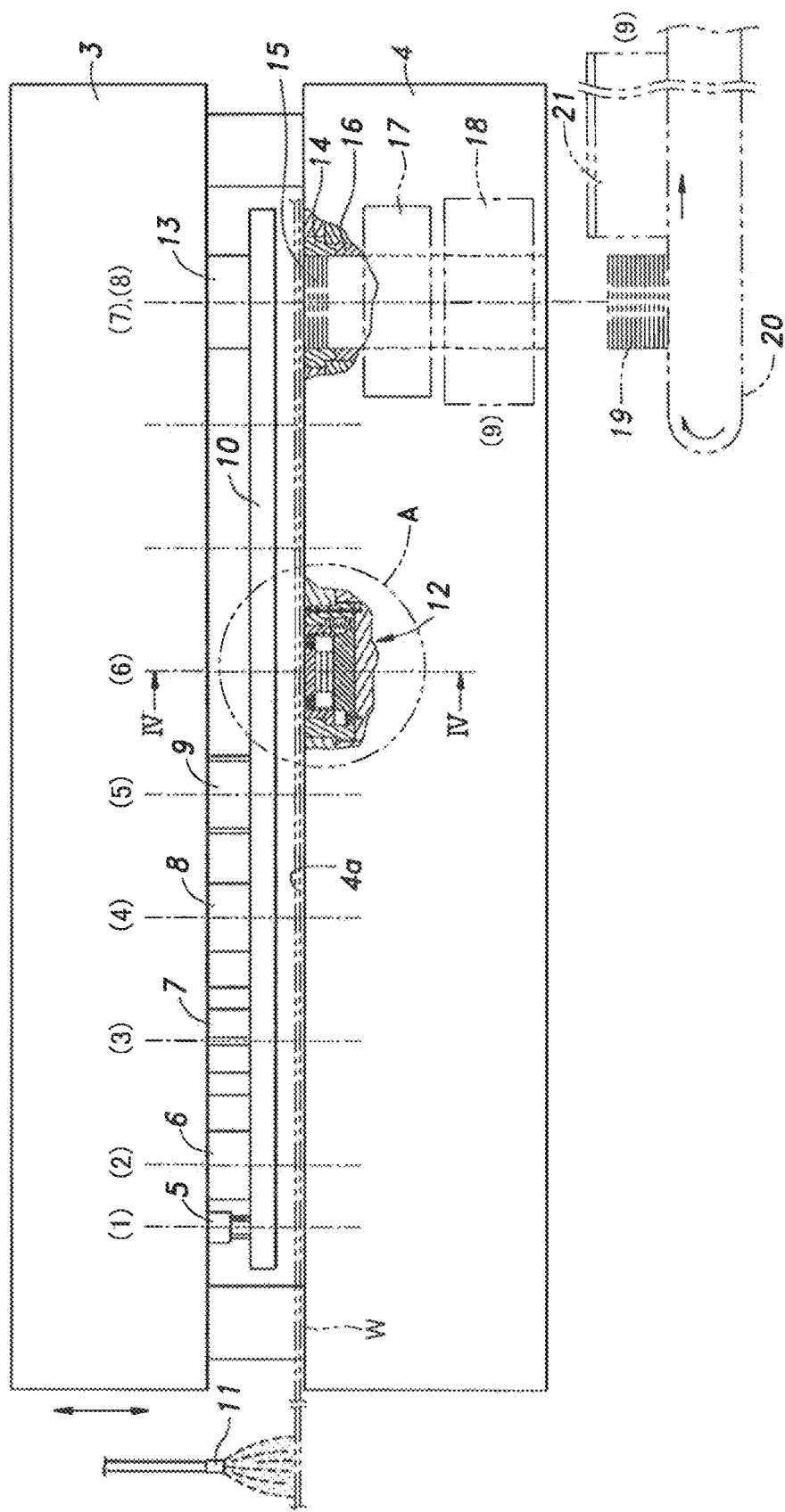
FIG. 3 is a diagram of the progressive metallic die machine.

FIG. 1 is a diagram showing a strip layout associated with a progressive metallic die machine 1 given as a first embodiment of the present invention, FIG. 2 is a plan view of a blanked iron core laminate, and FIG. 3 is a diagram of the progressive metallic die machine. The illustrated embodiment is directed to a manufacturing process of a laminated iron core 19 for stepping motors, and this process includes, as an example, preliminary punching step (1)-(5), an adhesive agent application step (6), a blanking step (7), a rotative stacking step (8) and a heating step (9).

As shown in FIG. 1, in the preliminary punching step, a sheet metal strip W is subjected to punching for locating holes P (1), punching for a central hole d1 (2), punching for slots S (3), punching for a final central hole (4) and punching for internal teeth m (5), in a sequential manner. As a result, the basic shape of the iron core laminate 2 except for the outer profile (see FIG. 2) is determined. These punching strokes are performed while the sheet metal strip W is transferred in an intermittent manner in the progressive metallic die machine 1 (apparatus for manufacturing laminated iron cores) shown in FIG. 1 by using punches 5-9 and 13 attached to a vertically moveable upper metallic die assembly 3 and dies (not shown in the drawings) corresponding to the punches 5-9 and 13 that are positioned on a lower metallic die assembly 4 opposing the upper metallic die assembly 3. The numerals in brackets (1) to (9) in FIG. 3 correspond to the various steps (1) to (9) (correspond to the positions where the various steps are performed in the progressive metallic die machine 1) shown in FIG. 1.

The upper metallic die assembly 3 is provided with a stripper plate 10 which is vertically slidable via a stripper guide not shown in the drawings. The stripper plate 10 moves with the upper metallic die assembly 3 when the punches 5-9 and 13 are applied to the sheet metal strip W such that the sheet metal strip W is pressed against the upper surface 4a of the lower metallic die assembly 4 (or the dies thereof), and, upon completion of the punching operation, separates the punched out sheet metal strip W from the punches 5-9 and 13 by moving upward with some time delay with respect to the upper metallic die assembly 3.

The progressive metallic die machine 1 is provided with an oil applicator 11 for applying punch press oil to the sheet metal strip W that is fed between the upper metallic die assembly 3 and the lower metallic die assembly 4. The oil applicator 11 may consist of a spray device for applying the punch press oil in the form of mist onto the entire upper surface (entire width) of the sheet metal strip W that is fed through the progressive metallic die machine 1. Other per se known arrangements such as roller, stamps and doctor blades may also be used as long as the oil can be applied to the required part of the surface of the sheet metal strip W. Also, the oil may be applied to the lower surface of the sheet metal strip W instead of the upper surface thereof, or to the both surfaces of the sheet metal strip W. A curing agent may also be added to the punch press oil for promoting the curing of the adhesive agent which will be discussed hereinafter. In such a case, the curing agent is applied simultaneous as the punch press oil onto the sheet metal strip W (the upper surface thereof, in the illustrated embodiment).

The punch press oil may contain base oil such as mineral oil (diesel oil) and synthetic oil, and additives such as extreme pressure agents, anti-rust agents and anti-corrosion agents. The extreme pressure agents may consist of compounds of such substances as sulfur and phosphorus that react with the metal under a high temperature created by an extreme pressure and produce a film of a soft metallic compound on the friction surface. The presence of such a film between the punch and the sheet metal strip W prevents excessive friction or seizing. The curing agent may consist of copper soap (which is a compound of fatty acid and copper) diluted with a solvent such as acetone and heptone. The copper ions that elute from the soap promote the curing of the adhesive agent. In the illustrated embodiment, the curing speed of the adhesive agent (which will be discussed hereinafter) is increased by the curing agent so that the adjoining iron core laminates 2 can be bonded to one another in a very short period of time without requiring a degreasing process.

The adhesive agent application step (6) is performed following the preliminary punching step (1)-(5). In this step, an adhesive agent is applied to the sheet metal strip W by an adhesive agent application unit 12 provided on the lower metallic die assembly 4 of the progressive metallic die machine 1. The adhesive agent is applied to a plurality of prescribed spots designated in eight pole sections J extending radially inward between adjoining slots S and a yoke section Y extending along an outer peripheral part of the iron core laminate 2 (a pair of spots E1 and E2 on each pole section J radially spaced from each other, and a spot E3 on the yoke section Y centrally aligning with each pole section J) in the form of dots. Thus, the spots E1 are eight in number, and area arranged circumferentially, and the same is true with the spots E2 and E3.

As will be discussed hereinafter, the application of the adhesive agent is skipped at every n-th iron core laminate or each separating iron core laminate. In the illustrated embodiment, the adhesive agent consists of a per se known anaerobic adhesive agent. The spots E1 to E3 are shown on the upper surface of the iron core laminate 2 in FIG. 2, but, in reality, the adhesive agent is applied to the lower surface of each iron core laminate 2 during the manufacturing process.

The blanking step (7) is performed following the adhesive agent application step (6). During this step, the outer profile D is punched out by using a blanking punch 13 attached to the upper metallic die assembly 3 and a rotatable die 14 provided on the lower metallic die assembly 4 in correspondence to the blanking punch 13, whereby the punching process for the iron core laminate 2 is completed.

The rotative lamination step (8) is performed following the blanking step (7). As shown in FIG. 3, the iron core laminate 2 that has been blanked in the blanking step (7) is stacked on an iron core laminate stack 15 placed in the rotatable die 14 so that the iron core laminate stack 15 is pushed into a squeeze ring 16 positioned below the rotatable die 14 in a sequential manner. As each iron core laminate 2 is blanked and stacked, a rotary actuator 17 indexes the rotatable die 14 by a prescribed angle (90 degrees, for instance) before the next iron core laminate 2 is blanked and stacked on the existing iron core laminate stack 15. Thus, each iron core laminate 2 is stacked in a different angular orientation so that any minute fluctuations in the thickness that may be present in the iron core laminates 2 are averaged, and the stack height of the final products (laminated iron cores) can be managed at a high precision.

When each blanked iron core laminate 2 is laminated on the iron core laminate stack 15, the lower surface of the blanked iron core laminate 2 is brought into close contact with the upper surface of the iron core laminate stack 15 so that each dot of the adhesive agent (at the corresponding spot E1 to E3) deposited on the lower surface of the blanked iron core laminate 2 spreads out, and gets favorably mixed with the curing agent which is already deposited on the upper surface of the iron core laminate 2 positioned on the upper end of the iron core laminate stack 15.

The heating step (9) is performed following the rotative lamination step (8). A first heating unit 18 is positioned below the squeeze ring 16 to heat the iron core laminate stack 15 as it moves downward. The adhesive agent between adjacent iron core laminates 2 is heated and cured so that the bonding strength of the adhesive agent can be increased. The heating unit for the adhesive agent may consist of a heater configured to blow hot air onto the iron core laminate stack 15. Following the heating by the first heating unit 18, each iron core laminate stack 15 is separated at the separating iron core laminate so that a laminated iron core 19 consisting of a prescribed number of iron core laminates 2 can be obtained. The laminated iron core 19 is placed on a belt conveyor 20 placed under the lower metallic die assembly 4, and is transported to a subsequent manufacturing step (not shown in the drawings). A second heating unit 21 is position in an intermediate part of the transportation path of the belt conveyor to reheat each laminated iron core 19 that is being transported. Thereby, the bonding strength between the adjacent iron core laminates can be further increased.

The configurations, sizes and numbers of the tools (punches and dies) for the punching work provided on the upper metallic die assembly 3 and the lower metallic die assembly 4 of the progressive metallic die machine 1 can be freely modified depending on the configurations and other attributes of the iron core laminates 2 that are to be produced. The kinds and contents of the adhesive agent and the use or non-use of the curing agent (or reaction initiator) mentioned in this disclosure are not intended to be limitative of the present invention, and these agents may be freely selected from those that have properties (such as bonding quality, curing property and viscosity) that are at least compatible to the adhesive agent application unit 12 (which will be described hereinafter).

The structure of the adhesive agent application unit 12 of the progressive metallic die machine 1 and the details of the adhesive agent application process are described in the following.

Figure 4:
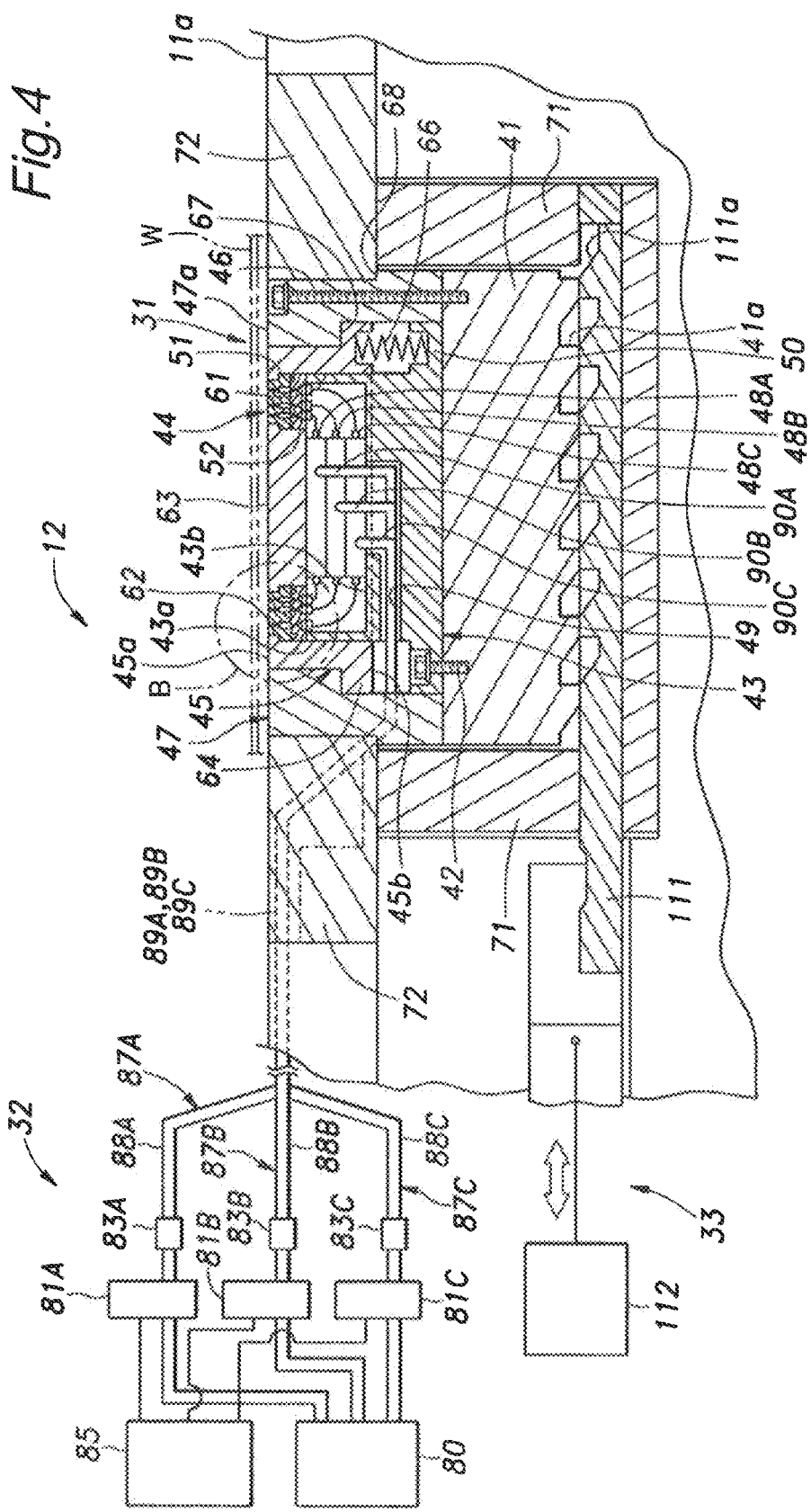
FIG. 4 is a sectional view of a part of FIG. 3 indicated by A taken along line IV-IV.
Figure 5:
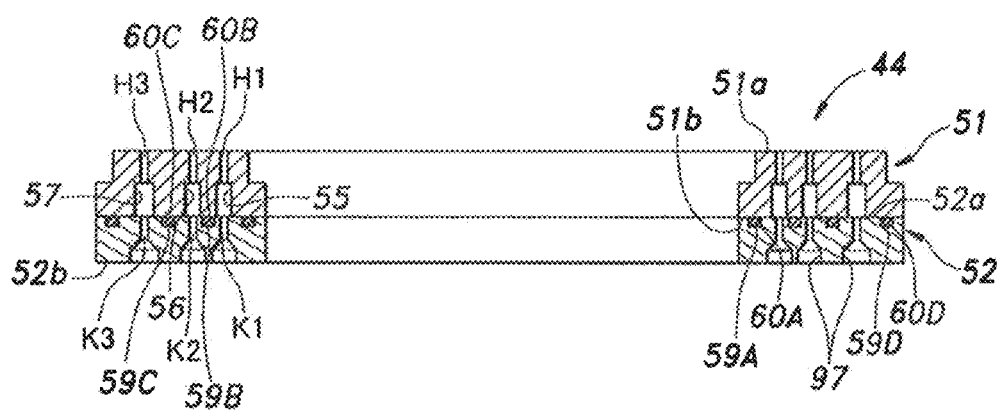
FIG. 5 is a sectional view showing the structure of a nozzle block.
Figure 6:
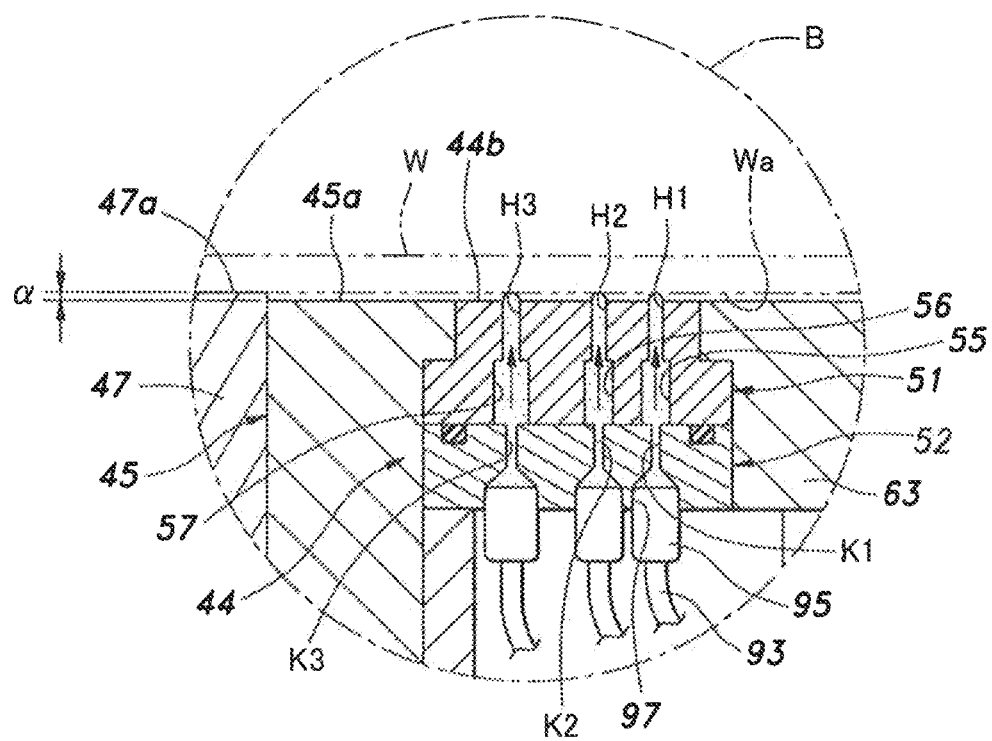
FIG. 6 is an enlarged view of a part of FIG. 4 indicated by B.
Figure 7:
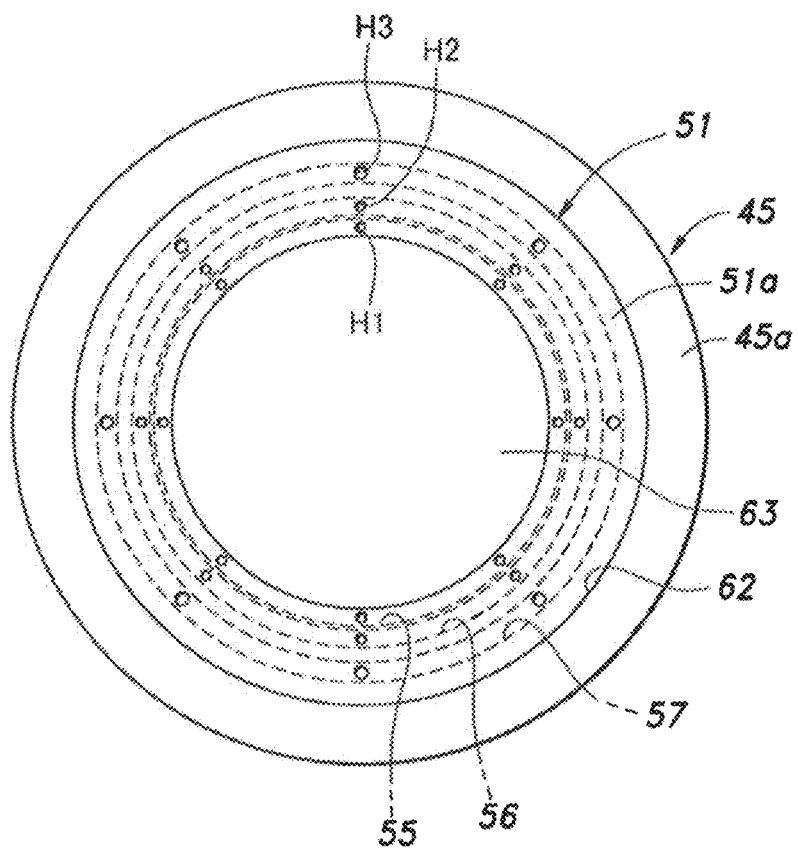
FIG. 7 is a plan view of an adhesive agent ejection unit.
Figure 8:
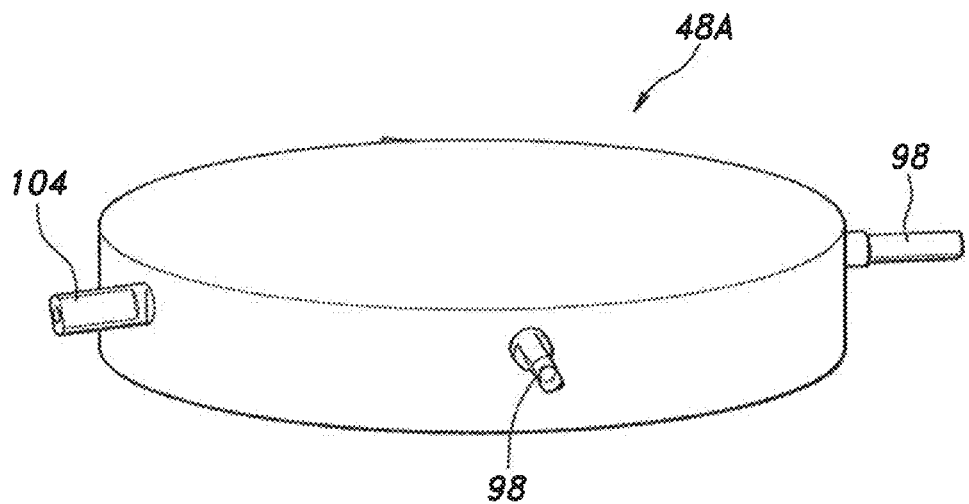
FIG. 8 is a perspective view showing the structure of a manifold member.
Figure 9:
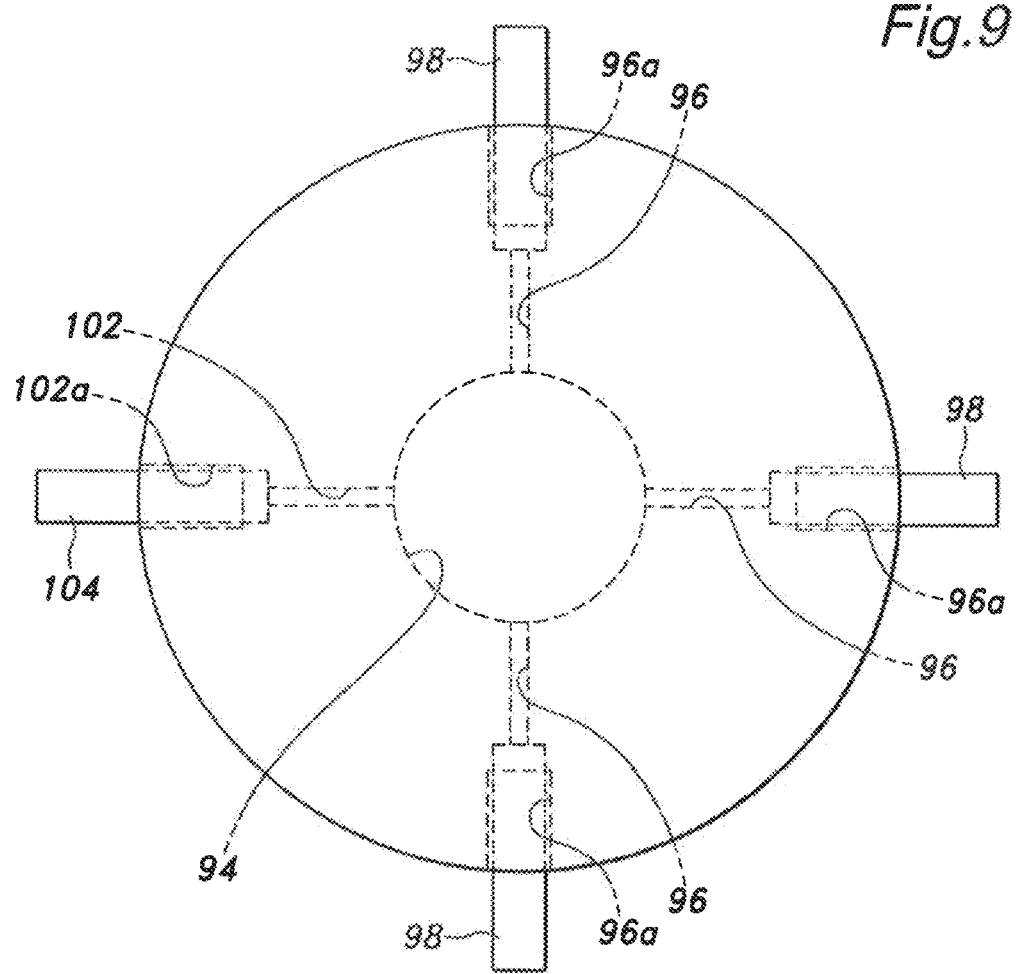
FIG. 9 is a plan view of the manifold member.
Figure 10:
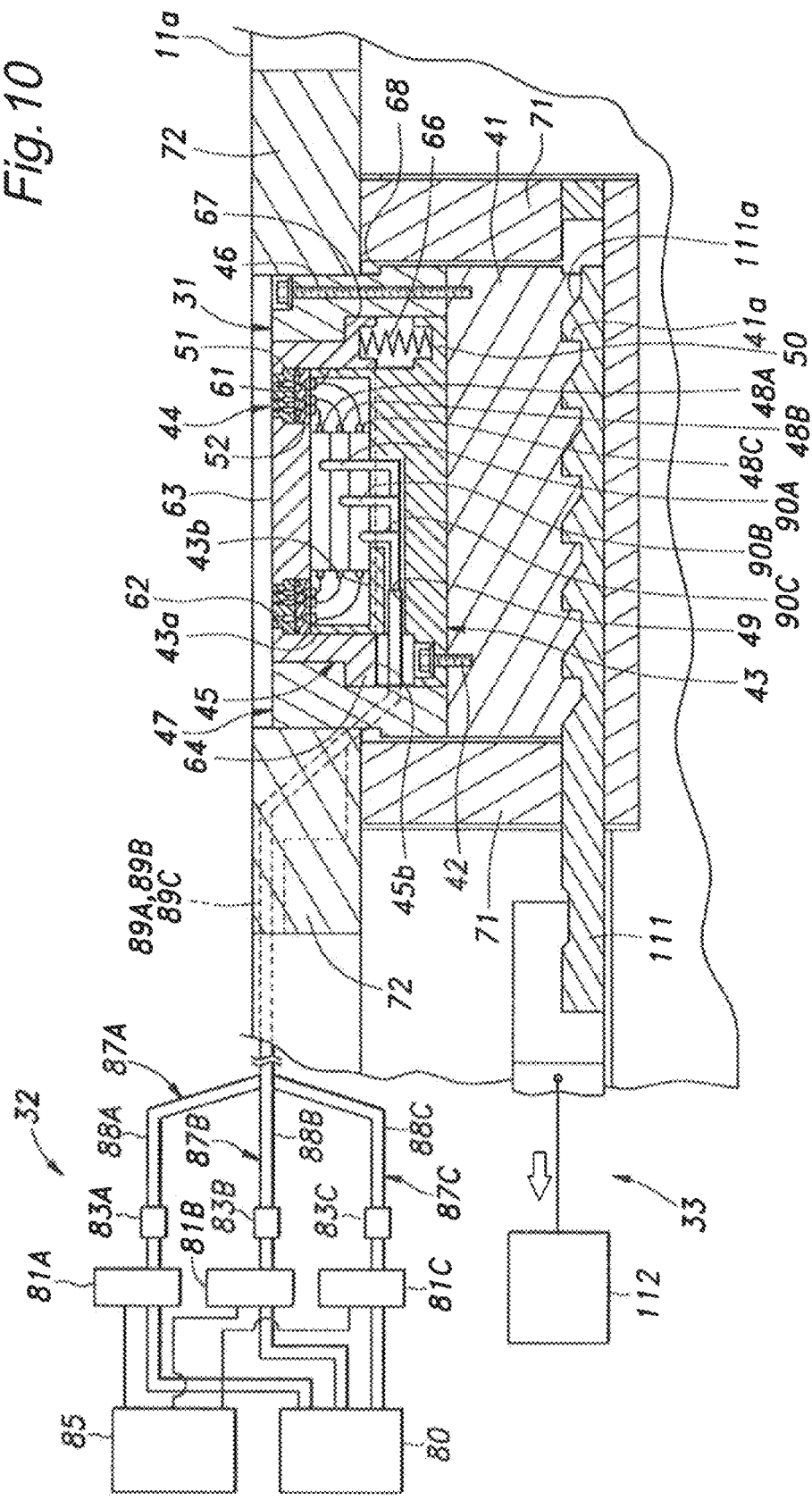
FIG. 10 is a view showing the state of an adhesive agent application unit when application of the adhesive agent is interrupted.

FIG. 4 is a sectional view of a part of FIG. 3 indicated by A taken along line IV-IV, FIG. 5 is a sectional view showing the structure of a nozzle block 44, FIG. 6 is an enlarged view of a part of FIG. 4 indicated by B, FIG. 7 is a plan view of an adhesive agent ejection unit 31, FIG. 8 is a perspective view showing the structure of a manifold member 48A, FIG. 9 is a plan view of the manifold member, and FIG. 10 is a view showing the state of an adhesive agent application unit 12 when application of the adhesive agent is interrupted.

As shown in FIG. 4, the adhesive agent application unit 12 includes an adhesive agent ejection unit 31 for ejecting a prescribed amount of the adhesive agent toward the application surface (lower surface) of the sheet metal strip W, an adhesive agent supply unit 32 for supplying the adhesive agent to the adhesive agent ejection unit 31 at a prescribed flow rate or at a prescribed pressure, and a reciprocating drive unit 33 for moving the adhesive agent ejection unit 31 toward and away from the application surface of the sheet metal strip W in a vertical direction.

The adhesive agent ejection unit 31 is provided on the lower metallic die assembly 4, and includes a base member 41, an adhesive agent introduction block 43 fixedly attached to the upper surface of the base member 41 with screws 42, a nozzle block (casing) 44 positioned on top of the adhesive agent introduction block 43, a retaining block 45 accommodating an upper part of the adhesive agent introduction block 43 and the nozzle block 44, and a support table 47 surrounding the retaining block 45 and fixedly attached to the upper surface of the base member 41. As will be discussed hereinafter, manifold members (manifolds) 48A-48C for branching out the supply passage for the adhesive agent leading to the nozzle block 44 are provided in the retaining block 45 under the nozzle block 44. The manifold members 48A-48C are provided with an identical structure, and are assembled in a vertically stacked up relationship.

The adhesive agent introduction block 43 is generally cylindrical in shape, and is provided with a through hole 49 extending from an outer circumferential surface 43a thereof to an upper surface 43b thereof as an introduction passage for the adhesive agent. The lower end of the adhesive agent introduction block 43 is provided with a flange 50 for securing the adhesive agent introduction block 43 to the base member 41.

As shown in FIG. 5, the nozzle block 44 includes an annular upper plate 51 and an annular lower plate 52 underlying the upper plate 51. The upper plate 51 is substantially annular in plan view, and has a projection on the upper surface thereof in a radial cross sectional view. As shown in FIG. 6, the upper plate 51 is provided with a plurality of ejection orifices H1 to H3 extending vertically, and opening out at the upper surface 51a of the upper plate 51.

The ejection orifices form a first ejection orifice group (of eight) located in a radially most inward part, and are arranged along the circumferential direction at a regular interval. The ejection orifices H2 form a second ejection orifice group (of eight) located in a radially intermediate part, and are arranged along the circumferential direction at a regular interval similarly as the ejection orifices H1. The ejection orifices H3 form a third ejection orifice group (of eight) located in a radially most outward part, and are arranged along the circumferential direction at a regular interval similarly as the ejection orifices H1 and H2. The arrangement of these ejection orifices H1 to H3 corresponds to the arrangement of the application spots E1 to E3 of the adhesive agent shown in FIG. 2.

In the illustrated embodiment, the first to third ejection orifice groups included a same number of the ejection orifices H1 to H3. However, the different ejection orifice groups may include different numbers of the ejection orifices. The ejection orifices H1 to H3 are arranged so as to linearly align along the radial directions of the upper plate 51, but may also be arranged such that the ejection orifices H1 to H3 of the different groups are offset one another in the circumferential direction. The ejection orifices may have different shapes and/or sizes depending on the required amounts of the adhesive agent to be applied and the area sizes of application. However, it is preferred that the shape and size of the ejection orifices belonging to the same group are the same so that the machining of the nozzle block 44 may be facilitated, and the selection and adjustment of the amount of the adhesive agent that is administered from each ejection orifice may be facilitated.

As shown in FIGS. 5 and 6, first to third adhesive agent storage grooves (adhesive agent storage chambers) 55 to 57 with a prescribed depth are formed along the lower surface 51*b* of the upper plate 51*a*. The first to third adhesive agent storage grooves 55 to 57 are annular in shape in plan view and have different diameters. The ejection orifices H1 communicate with the first adhesive agent storage groove 55 that is located under the ejection orifices H1 (in an overlying relationship in plan view), and has the smallest diameter. The ejection orifices H2 communicate with the second adhesive agent storage groove 56 that is located under the ejection orifices H2, and have a larger diameter than the first adhesive agent storage groove 55 and a smaller diameter than the third adhesive agent storage groove 57. The ejection orifices H3 communicate with the third adhesive agent storage groove 57 that is located under the ejection orifices H3, and has the largest diameter.

In the illustrated embodiment, the ejection orifices H1 and H2 belonging to the first and second orifice groups have a same diameter, and the ejection orifices H3 belonging to the third ejection orifice group have a greater diameter than the ejection orifices H1 and H2 belonging to the first and second ejection orifice groups. Therefore, if the pressure of the adhesive agent in the first to third adhesive agent storage grooves 55 to 57 is the same, the flow rate of the adhesive agent ejected from each ejection orifice H3 is normally greater than the flow rate of the adhesive agent ejected from each ejection orifice H1 and H2. However, it is also possible that the ejection orifices H1 to H3 of the first to third ejection orifice groups may be given with a same diameter, and the pressure of the adhesive agent in the third adhesive agent storage groove 57 is greater than the pressure of the adhesive agent in the first and second adhesive agent storage grooves 55 and 56. Alternatively or additionally, the diameter of each ejection orifice H3 of the third ejection orifice group may be greater than that of each ejection orifice H1 and H2 of the first and second ejection orifice groups, and the pressure of the adhesive agent in the third adhesive agent storage grooves 57 is greater than the pressure of the adhesive agent in the first and second adhesive agent storage grooves 55 and 56.

The lower plate 52 is substantially annular in plan view, and has a substantially rectangular cross section. The lower plate 52 in substantially identical to the upper plate 51 in the inner and outer diameters. When the upper plate 51 is laid over onto the lower plate 52, the openings of the first to third adhesive agent storage grooves 55 to 57 of the upper plate 51 are closed by the upper surface 52*a* of the lower plate 52 so that the first to third adhesive agent storage grooves 55 to 57 function as a space for temporarily storing the adhesive agent for the purpose of stabilizing the flow rate (pressure) of the adhesive agent that is ejected from the ejection orifices H1 to H3. The volume of the adhesive agent that is stored in the first to third adhesive agent storage grooves 55 to 57 (the capacity of each adhesive agent storage chambers) is preferred to be large enough so that the pressure fluctuations in the ejection orifices H1 to H3 are small enough for stable ejection of the adhesive agent from the ejection orifices H1 to H3. The lower plate 52 is provided with a plurality of injection orifices K1 to K3 that are vertically passed through the thickness of the lower plate 52.

Although not shown in the drawings, the openings of the injection orifices K1 at the upper surface 52*a* of the lower plate 52 may be circumferentially offset from the ejection orifices H1 (the lower openings of the ejection orifices H1 to be more precise) in plan view (such that the injection orifices K1 are located at midpoints between adjacent ejection orifices H1, for instance). Similarly, the injection orifices K2 and K3 may be circumferentially offset from the ejection orifices H2 and H3, respectively, in plan view (such that the injection orifices K2 and K3 are located at midpoints between adjacent ejection orifices H2 and H3, respectively, for instance). The inner diameter of each injection orifice K1 to K3 may be larger than the inner diameter of the corresponding ejection orifice H1 to H3, and the number of the injection orifices K1 to K3 may be smaller than that of the ejection orifices H1 to H3. As shown in FIG. 5, the lower end of each injection orifice K1 to K3 is formed with an enlarged part or a connector connecting portion 97 that opens out from the lower surface 52*b* of the lower plate 52 so that a connector 95 (see FIG. 6) for a tube 93 connected to the corresponding manifold member 48A to 48C (which will be described hereinafter) may be connected thereto.

A plurality of annular seal grooves 59A to 59D are formed on the upper surface 52*a* of the lower plate 52. The seal grooves 59A and 59D are located on the inside and outside, respectively, such that the injection orifices K1 to K3 are radially interposed between the two seal grooves 59A and 59D. The seal groove 59B is located between the injection orifices K1 and the injection orifices K2, and the seal groove 59C is located between the injection orifices K2 and the injection orifices K3. A annular seal ring 60A to 60D made of polymer material is fitted in each of the annular seal grooves 59A to 69D so that any leakage of the adhesive agent through the interface between the lower surface 51*b* of the upper plate 51 and the upper surface 52*a* of the lower plate 52 may be avoided.

Referring to FIG. 4 once again, the retaining block 45 is cylindrical in shape, and is provided with a radial flange 64 at the lower end thereof. The upper end of a central bore 61 of the retaining block 45 is formed with a circular reduced diameter portion 62 opening out at the upper surface 45*a* thereof, exposing the upper plate 51 (the ejection orifices H1 to H3 of the nozzle block 44. The lower end of the central bore 61 opens out at the lower surface 45*b* thereof to slidably receive the adhesive agent introduction block 43.

The nozzle block 44 is fixedly attached to the retaining block 45 via fasteners not shown in the drawings. The inner peripheral part of the reduced diameter portion 62 of the retaining block 45 is provided with a shape corresponding to (conformal to) the stepped outer peripheral of the upper plate 51. A cover block 63 is fitted into the central bore of the nozzle block 44, and is fixedly secured thereto via fasteners not shown in the drawings. The outer periphery of the cover block 63 is provided with a shape corresponding to (conformal to) the stepped inner periphery of the upper plate 51. Compression coil springs 66 are interposed between the lower surface of the radial flange 64 provided at the lower end of the retaining block 45 and the upper surface of the radial flange 50 of the adhesive agent introduction block 43.

The manifold members 46A to 48C are positioned under the cover block 63 in the illustrated embodiment, but at least a part of the manifold members 46A to 48C may be positioned within the central bore of the nozzle block 44 by suitably modifying or omitting the cover block 63. Thereby, the size of the adhesive agent ejection unit 31 may be minimized in spite of the presence of the manifold members 46A to 48C.

The support table 47 is cylindrical in shape, and is reduced in inner diameter at the upper end thereof so that a stepped portion (shoulder surface) 67 is defined in a vertically middle part of the inner circumferential surface thereof. By engaging the radial flange 64 of the retaining block 45 with this stepped portion 67, the upward movement (in the direction to protrude from the upper surface 11*a* of the lower metallic die assembly 4) of the retaining block 45 is prevented. The lower part of the support table 47, along with the base member 41, is received in a holder 71 which is fixedly secured in the lower metallic die assembly 4. Also, the upper part of the support table 47 is reduced in outer diameter so that a stepped portion (shoulder surface) 68 is defined in a vertically middle part of the outer circumferential surface thereof. By engaging this stepped portion 68 with a holding member 72, the upward movement of the adhesive agent ejection unit 31 is prevented. The upper surface 47a of the support table 47 and the upper end surface of the holding member 72 are substantially flush with the upper surface 11a of the lower metallic die assembly 4.

As shown in FIG. 6, the upper surface 45a (or the tips of the ejection orifices H1 to H3) of the retaining block 45 is positioned slightly lower than the upper surface 47a of the support table 47 so that a prescribed gap α is created between the upper surface 47a of the support table 47 and the upper surface 45a of the retaining block 45. Therefore, when the upper metallic die assembly 3 (see FIG. 3) has descended, and the stripper plate 10 has pressed the sheet metal strip W against the upper surface 4a of the lower metallic die assembly 4, the gap α is created between the upper surface 45a of the retaining block 45 exposing the tips of the ejection orifices H1 to H3 and the lower surface Wa of the sheet metal strip W.

Because the adhesive agent is ejected from the ejection orifices H1 to H3 while the gap α is created between the upper surface 45a of the retaining block 45 and the lower surface Wa of the sheet metal strip W, the lower surface Wa of the sheet metal strip W is prevented from touching the upper surface 45a of the retaining block 45 (or the tips of the ejection orifices H1 to H3) so that the adhesive agent can be deposited on the lower surface Wa of the sheet metal strip W as well defined dots, instead of spreading in an uncontrolled manner.

Because the compression coil springs 66 are interposed between the adhesive agent introduction block 43 and the retaining block 45, the positional precision of the upper surface 45a of the retaining block 45 or the precision of the gap α can be ensured with ease. As no fasteners such as screws are required to assemble the retaining block 45, no space is wasted and the assembly work is facilitated.

Referring to FIG. 4 once again, the adhesive agent supply unit 32 essentially consists of three dispensers 81A to 81C for supplying the adhesive agent stored in an adhesive agent tank 80 to the adhesive agent ejection unit 31, flow meters 83A to 83C for detecting the flow rates of the adhesive agent that is supplied from the dispensers 81A to 81C to the adhesive agent ejection unit 31, and a control unit 85 for controlling the operation of the dispensers 81A to 81C.

Each dispenser 81A to 81C consists of a per se known pump unit that can supply the adhesive agent to the adhesive agent ejection unit 31 at a prescribed pressure and flow rate, and is connected to the adhesive agent ejection unit 31 via a corresponding individual supply passage 87A to 87C. The control unit 85 controls the operation of the motor (not shown in the drawing) provided for each dispenser 81A to 81C according to the detection result of the corresponding flow meter 83A to 83C so that the flow rate of the adhesive agent that is supplied from each dispenser 81A to 81C may be individually adjusted.

Alternatively, a pressure sensor for detecting the pressure of the adhesive agent supplied by each dispenser 81A to 81C may be provided so that the control unit 85 may individually control the pressure of the adhesive agent that is supplied by the dispenser 81A to 81C. In such a case also, the adhesive agent placed under pressure by the dispensers 81A to 81C is supplied to the adhesive agent ejection unit 31 via the respective supply passages 87A to 87C at flow rates corresponding to the pressure of the adhesive agent.

Each supply passage 87A to 87C for the adhesive agent consists of a tube 88A to 88C connected between the corresponding dispenser 81A to 81C and the lower metallic die assembly 4, a communication passage 89A to 89C formed in a part of the lower metallic die assembly 4 (including the holding member 72 and the support table 47) connected to the downstream end of the corresponding tube 88A to 88C, and another tube 90A to 90C connected to the downstream end of the corresponding communication passage 89A to 89C and extending to the corresponding manifold member 48A to 48C via a through hole 49 of the adhesive agent introduction block 43.

As shown in FIGS. 8 and 9, the manifold member 48A is provided with a circular shape, and centrally defines a cylindrical space that serves as an adhesive agent distribution portion 94. A plurality (three, in the illustrated embodiment) of branch passages 96 extend radially outward from the adhesive agent distribution portion 94. The outer end of each branch passage 96 is formed with an enlarged diameter portion serving as a connector connecting portion 96a into which a connector 98 for the tube 93 (see FIG. 6) is fitted. Thus, the tube 93 having the downstream end connected to the corresponding injection orifice K1 to K3 has an upstream end that is connected to this connector 98. The adhesive agent distribution portion 94 can therefore perform the function of temporarily storing the adhesive agent for evenly distributing the adhesive agent to the branch passages 96.

The manifold member 48A is also internally formed with a radially extending adhesive agent supply passage 102 which has a downstream end connected to the adhesive agent distribution portion 94. An enlarged diameter portion formed at the upstream end (outer end) of the adhesive agent supply passage 102 and serving as a connector mounting portion 102a receives a connector 104 therein. The downstream end of the corresponding tube 90A is connected to this connector 104 (see FIG. 4).

As all of the manifold members 48A to 48C are provided with a similar structure, any further detailed description of the other manifold members is omitted from this disclosure. These manifold members 48A to 48C are laid one over the other. The branch passages of the manifold members 48B and 48C are connected to the corresponding injection orifices K2 and K3 of the nozzle block 44.

Owing to these manifold members 48A to 48C, the adhesive agent can be injected into the first to third adhesive agent storage grooves 55 to 57 via the plural injection orifices K1 to K3 so that the pressure of the adhesive agent in the adhesive agent storage grooves 55 to 57 can be made uniform. As a result, an appropriate amount of the adhesive agent can be applied to the prescribed areas with optimum amounts (although the area sizes of the adhesive agent dots arranged in various parts of the iron core laminate may vary from one part to another, and the required bonding strength of the adhesive agent may vary from one spot to another on the iron core laminate due to the nature of the shape of the iron core laminate).

Referring to FIG. 4 once again, the reciprocating drive unit 33 includes a drive member 111 which causes the reciprocating movement of the adhesive agent ejection unit 31 by engaging the base member 41, and a drive unit 112 for providing the power required for moving the drive member 111 in the lengthwise direction thereof. The upper surface of the drive member 111 is provided with a saw-tooth shaped cam portion 111a configured for a linear motion. The cam portion 111a forms a cam mechanism in cooperation with a corresponding saw-tooth shaped cam portion 41a formed on the lower surface of the base member 41 so that the vertical reciprocating movement of the adhesive agent ejection unit 31 may be achieved. FIG. 4 shows the state where the earn portions 41a and 111a are not engaged (or in a disengaged state), and the adhesive agent ejection unit 31 is at the uppermost position suitable for applying the adhesive agent to the iron core laminate. The drive member 112 may consist of a per se known actuator (such a fluid cylinder and solenoid) that can achieve the linear motion of the drive unit 111. The cam mechanism shown in the illustrated embodiment is exemplary, and can be modified without departing from the spirit of the present invention.

The adhesive agent application process by the adhesive agent application unit 12 is briefly described in the following.

Upon completion of the preliminary punching step, the stripper plate 10 descends on the transferred sheet metal strip W during the following punching stroke so that the sheet metal strip W is pressed against the upper surface 11a of the lower metallic die assembly 4. At this time, the adhesive agent stored in the first to third adhesive agent storage grooves 55 to 57 is placed under pressure by the respective dispensers 81A to 81C so that the adhesive agent is ejected upward from the upper ends of the ejection orifices H1 to H3 of the retaining block 45 onto the lower surface Wa of the sheet metal strip W at a speed determined by the opening areas of the ejection orifices H1 to H3 and the pressure of the adhesive agent. At this time, the bonding age rises upward from the upper ends of the ejection orifices H1 to H3 across the gap α toward the lower surface Wa of the sheet metal strip W.

Owing to this arrangement, during the punching process of the iron core laminates 2, as the upper metallic die assembly 3 descends, and the stripper plate 10 presses the sheet metal strip W against the upper surface 4a of the lower metallic die assembly 4, the adhesive agent is pushed out of the ejection orifices H1 to H3, and deposited (transferred) onto the prescribed spots on the lower surface Wa of the sheet metal strip W by properly selecting the timing. See E1 to E3 in FIG. 2. As will be discussed hereinafter, the application of the adhesive agent is interrupted when each separating iron core laminate is conveyed to the adhesive agent application position.

The control unit 85 controls the operation of the dispensers 81A to 81C such that the flow rate of the adhesive agent supplied to the adhesive agent ejection unit 31 is maintained at a constant value (or more specifically the amount of the adhesive agent that is deposited on each application spot E1 to E3 is maintained at a (constant) target value value) In the illustrated embodiment, the amount (target value) of the applied adhesive agent at each application spot E1 and E2 is the same, and the amount (target value) of the applied adhesive agent at each application spot E3 is greater than that at each application spot E1 and E2. The amount of the applied adhesive agent at each application spot E1 to E3 can be estimated by measuring the diameter (or the area) of the deposited adhesive agent (which is substantially circular) at the application spot. In this case, by taking into account the speed of the vertical movement (punching speed) of the upper metallic die assembly 3, and the diameter (or the area) of the deposited adhesive agent at each application spot, the optimum control condition for the operation of the dispensers 81A to 81C (the pressures in the first to third adhesive agent storage grooves 55 to 57) can be determined.

By thus controlling the flow rate of the adhesive agent that is supplied to the adhesive agent ejection unit 31 to a constant value (by continuously supplying a prescribed amount of the adhesive agent from the ejection orifices H1 to H3), the adhesive agent can be applied in stable manner without being required to be synchronized with the speed (punching speed) of the vertical movement of the upper metallic die assembly 3 for the punching operation. In other words, because the supply of the adhesive agent is carried out without regard to the punching operation, the punching speed is not limited by the process of applying the adhesive agent, and the process of applying the adhesive agent is not affected by the punching operation.

The operation of the dispensers 81A to 81C (or more specifically the operation of the motors in the dispensers 81A to 81C) was controlled by the control unit 85 in the foregoing embodiment, but the flow rate of the adhesive agent that is supplied to the adhesive agent ejection unit 31 can also be controlled by providing a flow rate control unit such as a valve for controlling the flow rate of the adhesive agent in an appropriate part of each supply passage 87A to 87C, and by having the control unit 85 regulate the operation of the flow rate control units. This applies also to the second to fourth embodiments which will be described hereinafter.

In this progressive metallic die machine 1, as shown in FIG. 10, when the part of the sheet metal strip W that is to be punched corresponds to the separation iron core laminate (at which the laminated iron core 19 is separated), the application of the adhesive agent to this particular part of the sheet metal strip W is interrupted. In this case, the control unit 85 commands the drive unit 112 to move the drive member 111 in the direction indicated by an arrow in FIG. 10. As a result, the cam portion 111a of the drive member 111 and the cam portion 41a of the base member 41 engage each other (become meshed with each other), and the adhesive agent ejection unit 31 descends from the upper limit position shown in FIG. 4 to the lower limit position shown in FIG. 10 under the biasing force of a spring not shown in the drawings so that the gap α (see FIG. 6) between the lower surface Wa of the sheet metal strip W and the upper surface 45a of the retaining block 45 increases to a value greater than the height of the adhesive agent rising from the ejection orifices H1 to H3. As a result, even when the sheet metal strip W is brought into contact with the upper surface 4a of the lower metallic die assembly 4, the adhesive agent is not deposited on the surface of the part of the sheet metal strip W corresponding to the separation iron core laminate.

In this progressive metallic die machine 1, the ejection orifices H1 to H3 are associated with and communicated with the corresponding ones of the first to third adhesive agent storage grooves 55 to 57, respectively, so that the flow rate of the adhesive agent ejected from each ejection orifice H1 to H3 (or the pressure of the adhesive agent in each of the first to third adhesive agent storage grooves 55 to 57) can be easily adjusted, and the deposition of the adhesive agent can be performed in a stable manner without regard to the positioning and the numbers (or the arrangement and the numbers) of the adhesive agent application spots E1 to E3. The shape and other geometrical features of the adhesive storage chambers (the first to third adhesive agent storage grooves 55 to 57) provided in the nozzle block 44 of the illustrated embodiment are only exemplary, and can be modified freely depending on the arrangement of the ejection orifices for the adhesive agent without departing from the spirit of the present invention. In particular, when the ejection orifices H1 to H3 are provided in discrete areas in the adhesive application surface in corresponding groups, the adhesive agent of a suitable amount can be applied to each of these discrete areas.

In the illustrated embodiment, the laminated iron core 19 is formed by the iron core laminates 2 each having an annular or circular shape (or including at least a part which is substantially annular or circular). The progressive metallic die machine 1 is able to apply the adhesive agent to the inner application area corresponding to the first and second adhesive agent storage grooves 55 and 56 and to the outer application area corresponding to the third adhesive agent storage groove 57 by mutually different amounts (amounts suitable for the respective areas) in a stable manner. Depending on the shape of the iron core laminate 2 (the magnetic poles J thereof), one of the groups of the ejection orifices H1 and H2 may be omitted.

It is not essential to use the plural dispensers in the progressive metallic die machine 1 of the present invention, and it is also possible to use a single dispenser to supply all of the adhesive agent that is needed for the adhesive agent ejection unit 31. In such a case also, each of the ejection orifices H1 to H3 is associated with one of the first to third adhesive agent storage grooves 55 to 57, and communicated with the corresponding one of the first to third adhesive agent storage grooves 55 to 57 so that the flow rate of the adhesive agent that is ejected from the ejection orifices can be easily adjusted for each of the first to third adhesive agent storage grooves 55 to 57. In particular, by providing the dispensers 81A and 81C so as to correspond to the respective first to third adhesive agent storage grooves 55 to 57, the flow rate of the adhesive agent that is ejected from the ejection orifices of each different group associated with the corresponding adhesive agent storage grooves 55 to 57 can be adjusted depending on the sizes of the areas to which the adhesive agent is to be applied, and the necessary bonding strength for each of the particular areas without any difficulty.

Second Embodiment

Figure 11:
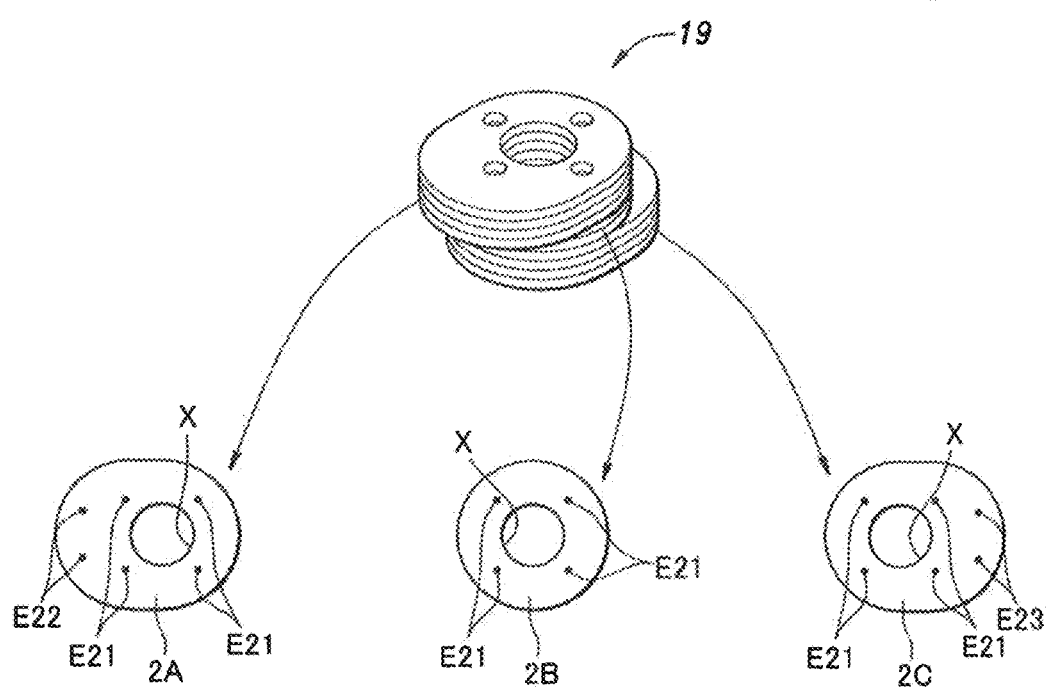
FIG. 11 is a diagram showing a laminated iron core of a second embodiment.
Figure 12:
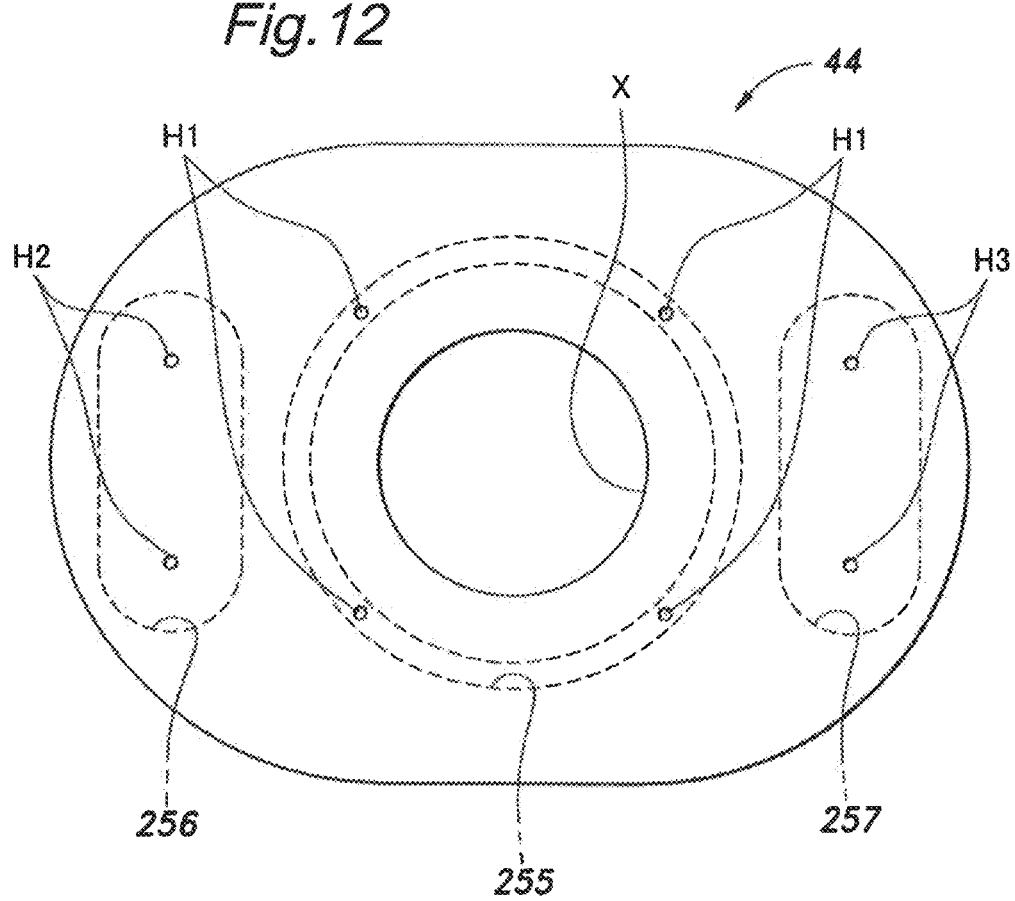
FIG. 12 is a plan view of a nozzle block of the second embodiment.

FIG. 11 is a diagram showing a laminated iron core 19 of a second embodiment, and FIG. 12 is a plan view of a nozzle block of the second embodiment. The parts corresponding to those of the first embodiment are denoted with like numerals in FIGS. 11 and 12, and such parts may be omitted from the following description as they are similar to the counterparts of the first embodiment.

The second embodiment is directed to a laminated iron core 19 which is suitable for use in such devices as resolvers, and formed by laminating a plurality (three, in the illustrated embodiment) of kinds of iron core laminates 2A to 2C (first to third iron core laminates 2A to 2C) having different shapes one after another each by a prescribed number as shown in FIG. 11. The first iron core laminates 2A are provided with a track shaped profile, and are provided with an opening X at a part offset in the lengthwise direction (in the rightward direction in FIG. 11). The second iron core laminates 2A are provided with a substantially circular profile, and is centrally provided with an opening X. The third iron core laminates 2C are provided with a track shaped profile similar to that of the first iron core laminates 2A, and are provided with an opening X at a part offset in the opposite lengthwise direction (in the leftward direction in FIG. 11).

In an adhesive agent application step (6) which is similar to the counterpart of the first embodiment, in regard to the first iron core laminates 2A, the adhesive agent is applied to a plurality of (for, in the illustrated embodiment) application spots E21 arranged circumferentially around the opening X and a plurality (two, in the illustrated embodiment) of application spots E22 arranged on a left side of the application spots E21. In regard to the second iron core laminates 2A, the adhesive agent is applied only to those application spots E21 that overlie with those of the first iron core laminates 2A (over the entire area of the second iron core laminates 2A) in plan view. In regard to the third iron core laminates 2C, the adhesive agent is applied to those application spots E21 that overlie with those of the second iron core laminate 2B (covering a circular area) in plan view and a plurality (two, in the illustrated embodiment) of application spots E23 arranged on a remaining right side area of the application spots E21. The application spots E21 to E23 are shown on the upper surface of each of the first to third iron core laminates 2A to 2C in FIG. 11, but the adhesive agent is applied to the lower surface of the iron core laminates 2A to 2C in the actual production process similarly as in the first embodiment. The same is true with FIGS. 14 and 16.

As shown in FIG. 12, the nozzle block 44 of the second embodiment is configured to be able to apply the adhesive agent over the entire areas of all of the iron core laminates 2A to 2C (see FIG. 11), and is provided with a plurality of ejection orifices H1 corresponding to the application spots E21, a plurality of ejection orifices H2 corresponding to the application spots E22, and a plurality of ejection orifices H3 corresponding to the application spots E23 opening out at the upper surface of the nozzle block 44. Similarly as in the first embodiment, the nozzle block 44 is internally provided with adhesive agent storage grooves 255 to 257 defining the spaces for temporarily storing the adhesive agent. Each ejection orifice H1 communicates with the annular adhesive agent storage groove 255 that is located under the ejection orifices H1 and surrounds the opening X. Each ejection orifice H2 communicates with the adhesive agent storage groove 256 that is track shaped in plan view, and is located under the ejection orifices H2. Each ejection orifice H3 communicates with the adhesive agent storage groove 257 that is track shaped in plan view, and is located under the ejection orifices H3.

In the second embodiment, the control unit 85 is not only able to control the applied amounts of the adhesive agent at the application spots E21 to E23 of the first to third iron core laminates 2A to 2C, but also able to turn on and off the application of the adhesive agent at each of the application spots E21 to E23. More specifically, when applying the adhesive agent to the third iron core laminates 2C, the operation of the selected dispenser 81B (or the ejection of the adhesive agent from the ejection orifices H2) is stopped (interrupted), and the adhesive agent is ejected only from the ejection orifices H1 and H3. As a result, the adhesive agent is applied to the application spots E21 and E23 of the third iron core laminates 2C. When applying the adhesive agent to the second iron core laminates 2A which are position on top of the third iron core laminates 2C, the operation of the selected dispensers 81B and 81C (or the ejection of the adhesive agent from the ejection orifices H2 and H3) is interrupted, and the adhesive agent is ejected only from the ejection orifices H1. As a result, the adhesive agent is applied only to the application spots E21 of the second iron core laminates 2B. When applying the adhesive agent to the first iron core laminates 2A which are position on top of the second iron core laminates 2B, the operation of the selected dispenser 81C (or the ejection of the adhesive agent from the ejection orifice H3) is interrupted, and the adhesive agent is ejected from the ejection orifices H1 and H2. As a result, the adhesive agent is applied to the application spots E21 and E22 of the second iron core laminates 2B.

As discussed above, in the progressive metallic die machine 1 of the second embodiment, even though the laminated iron core 19 is made by combining a plurality of kinds iron core laminates 2A to 2C having mutually different outer profiles, the application of the adhesive agent to unnecessary spots (the application of the adhesive agent to areas where the adjoining iron core laminates 2A to 2C do not overlap with each other) is avoided so that the smearing of the tools (punches and dies) for the press work with the adhesive agent can be avoided.

The control unit 85 may be configured such that the supply of the adhesive agent to at least one of the adhesive agent storage chambers can be interrupted when the iron core laminates forming the laminated iron core 19 change from one kind to another (except for the separation laminate, that is located in the uppermost or the lowermost part of the laminated iron core 19). Thereby, each of the ejection orifices H1 to H3 (or each ejection orifice group) is enabled to apply a required amount of the adhesive agent to each iron core laminate depending on the size of the application area and the required bonding strength without any difficulty. In particular, the application areas are classified into those overlapping between two successive iron core laminates and those not overlapping between two successive iron core laminates so that a suitable amount of the adhesive agent can be applied to each of such application areas.

Modification of Second Embodiment

Figure 13:
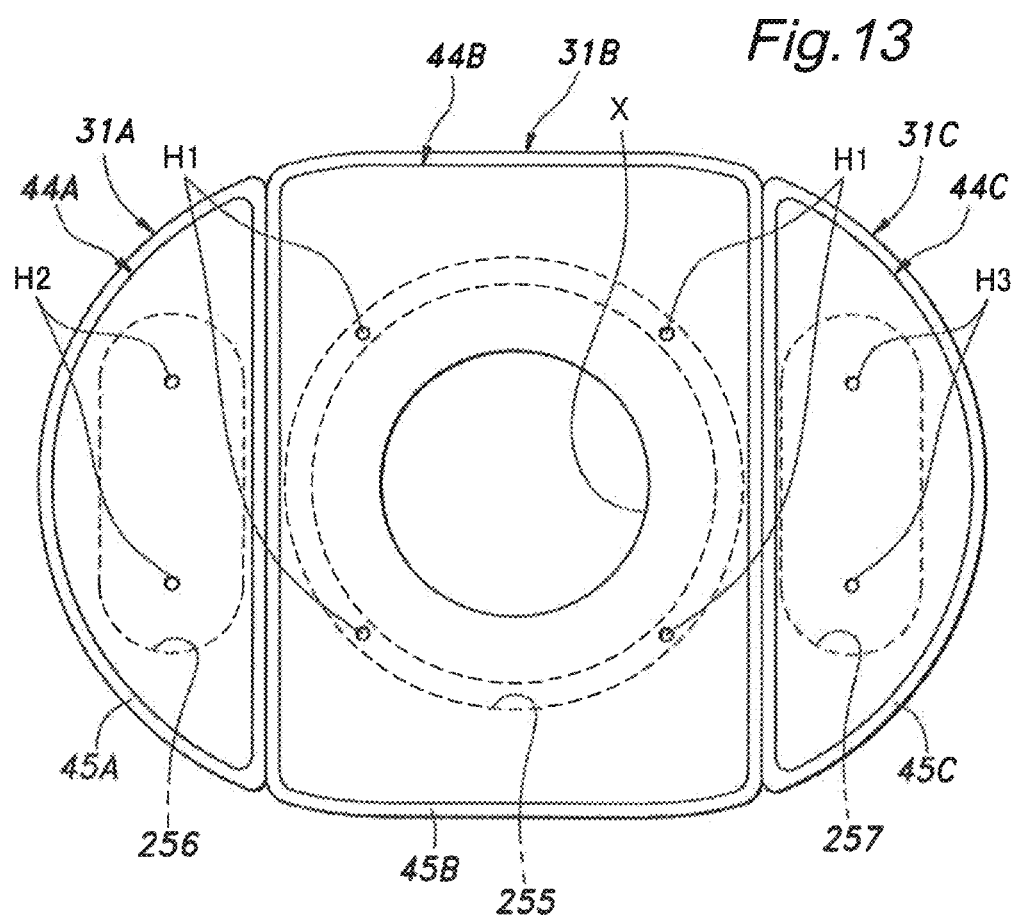
FIG. 13 is a plan view of a modification of the adhesive agent application unit of the second embodiment.

FIG. 13 is a plan view of a modification of the adhesive agent application unit of the second embodiment. The parts corresponding to those of the second embodiment may be omitted from the following description as they are similar to the counterparts of the second embodiment.

This modified embodiment differs from the second embodiment in that a plurality of adhesive agent ejection units 31A to 31C are provided. In the adhesive agent ejection unit 31A, a nozzle block 44A which is retained by a corresponding retaining block 45A is provided with a pair of ejection orifices H2 opening out for application spots E22. In the adhesive agent ejection unit 31B, a nozzle block 44B which is retained by a corresponding retaining block 45B is provided with four ejection orifices H1 opening out for application spots E21. In the adhesive agent ejection unit 31C, a nozzle block 44C which is retained by a corresponding retaining block 45C is provided with a pair of ejection orifices H3 opening out for application spots E23. Each nozzle block 44A to 44C is internally provided with an adhesive agent storage groove 255 to 257 defining a space for temporarily storing the adhesive agent.

In this modified embodiment, a reciprocating drive unit (not shown in the drawings) similar to the reciprocating drive unit 33 of the first embodiment is provided for each adhesive agent ejection unit 31A to 31C (or each nozzle block 44A to 44C) so that each nozzle block 44A to 44C is enabled to individually reciprocate (in the vertical direction). Whereas the application of the adhesive agent from each nozzle block 44A to 44C was stopped (interrupted) by individually controlling the corresponding dispenser 81A to 81C in the second embodiment, the application of the adhesive agent from each nozzle block 44A to 44C is stopped (interrupted) by controlling the corresponding reciprocating drive unit (or spacing the nozzle block 44A to 44C from the sheet metal strip W similarly as the embodiment illustrated in FIG. 10) in this modified embodiment.

By providing the plural nozzle blocks (casings defining adhesive agent storage chambers) corresponding to the respective ejection orifice group, the application of the adhesive agent from the ejection orifice groups can be individually and selectively enabled and interrupted without controlling the operation of the dispensers (or by controlling the supply of the adhesive agent from the dispenser by using valves or the like). This modification can be also applied to the other embodiments of the present invention.

Third Embodiment

Figure 14:
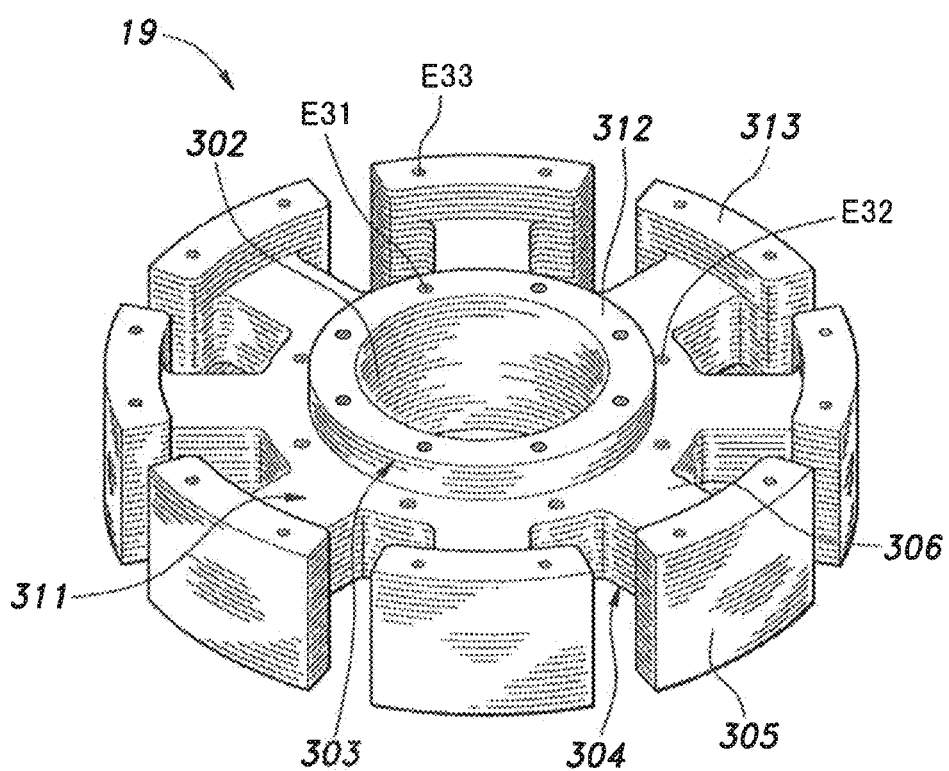
FIG. 14 is a perspective view of a laminated iron core of a third embodiment.
Figure 15:
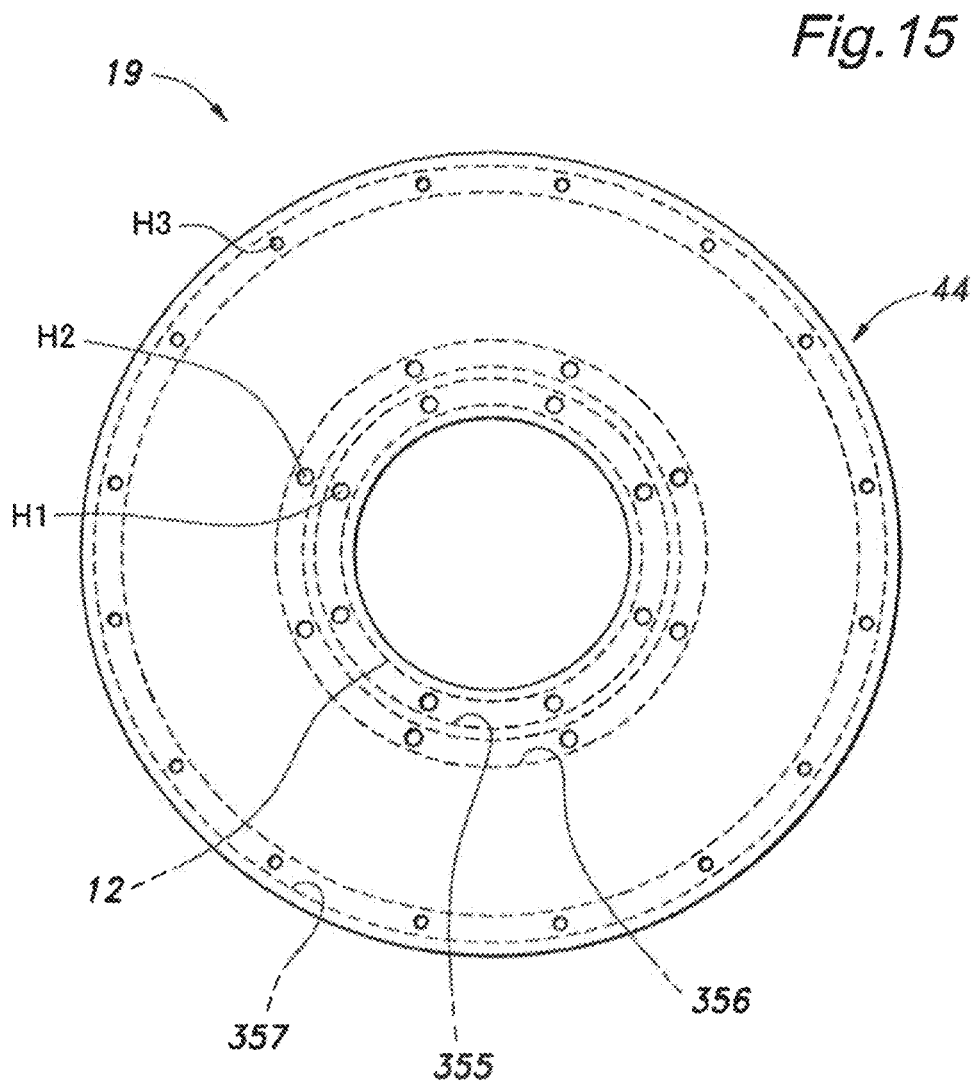
FIG. 15 is a plan view of a nozzle block of the third embodiment.

FIG. 14 is a perspective view of a laminated iron core 19 of a third embodiment, and FIG. 15 is a plan view of a nozzle block 44 of the third embodiment. The parts corresponding to those of the first or second embodiment are denoted with like numerals in FIGS. 14 and 15, and such parts may be omitted from the following description as they are similar to the counterparts of the first or second embodiment.

As shown in FIG. 14, the laminated iron core 19 of the third embodiment is a rotor of a motor, and consists of a cylindrical annular portion 303 centrally provided with a shaft hole 302 for receiving a motor shaft not shown in the drawings therein, and eight teeth 304 projecting radially from the outer periphery of the annular portion 303 at a regular angular interval. The laminated iron core 19 is formed by integrally bonding together a prescribed number of shaped iron core laminates 311 each including an annular part corresponding to the annular portion 303 and eight tooth parts corresponding to the teeth which are integrally connected to the annular part, a prescribed number, of annular laminates 312 that are laminated onto each end surface of a stack of the annular parts of the shaped iron core laminates 311, and a prescribed number of pole laminates 313 laminated onto each end surface of a radially outer end of a stack of the tooth parts. Each of the upper layer and the lower layer of the laminated iron core 19 where the shaped iron core laminates 311 are absent consists of the laminates including the annular laminates 312 and the pole laminates 313 that are connected to the corresponding annular laminates 312 via respective connecting pieces (which are removed during the manufacturing process) although the details thereof are not shown in the drawings. The profile of each shaped iron core laminate 311 coincides with the profile of the laminated iron core 19 in plan view.

The parts of the laminated iron core 19 where the pole laminates 313 are laminated have an axial dimension greater than winding portions 306 or the base end parts of the teeth 304. Similarly, the central part of the annular portion 303 (or the part where the annular laminates 312 are laminated) has the same axial dimension as pole portion 305 or the free end parts of the teeth 304. Because the axial dimension of each winding portion 306 is smaller than that of the pole portions 305 or the annular portion 303, even when the amount of the windings wound around the winding portions 306 is increased in order to improve the performance of the electric motor, the windings are prevented from protruding from the end surfaces of the laminated iron core 19 (rotor) so that the axial dimension of the electric motor can be minimized.

In an adhesive agent application step (6) which is similar to the counterpart of the first embodiment, the adhesive agent is applied to a plurality (eight, in the illustrated embodiment) of spots E31 on each annular laminate 312 that are arranged around the shaft hole 302 circumferentially at a regular angular interval. Similarly, the adhesive agent is applied to a plurality (two, in the illustrated embodiment) of spots E33 on each pole laminate 323 that are arranged around the shaft hole 302 circumferentially at a regular angular interval. Further, on each shaped iron core laminate 311, in addition to spots E31 and E33, the adhesive agent is applied to a plurality (eight, in the illustrated embodiment) of spots E31 that are arranged around the annular laminates 312 circumferentially at a regular angular interval.

As shown in FIG. 15, the nozzle block 44 is configured such that the adhesive agent can be applied to all of the annular laminates 312, the shaped iron core laminates 311 and the pole laminates 313 (see FIG. 14), and is provided with a plurality of ejection orifices H1 arranged circumferentially so as to correspond to the application spots E31, a plurality of ejection orifices H2 arranged circumferentially so as to correspond to the application spots E32 and a plurality of ejection orifices H3 arranged circumferentially so as to correspond to the application spots E33, all opening out at the upper surface of the nozzle block 44. Similarly as the first embodiment, the nozzle block 44 is internally provided with a first to third adhesive agent storage groove 355 to 357 (adhesive agent storage chambers) which are substantially annular in shape. The ejection orifices H1 communicate with the first adhesive agent storage groove 355 which is located under the ejection orifices H1 and has a smallest outer diameter. The ejection orifices H2 communicate with the second adhesive agent storage groove 356 which is located under the ejection orifices H2 and has an outer diameter greater than that of the first adhesive agent storage groove 355 and smaller than that of the third adhesive agent storage groove 357. The ejection orifices H3 communicate with the third adhesive agent storage groove 357 which is located under the ejection orifices H3 and has a largest outer diameter.

In the third embodiment, similarly as the second embodiment, the control unit 85 is not only able to control the applied amounts of the adhesive agent at the application spots E31 to E33 of the iron core laminates of the different layers, but is also able to turn on and off the application of the adhesive agent at each group of the application spots E31 to E33. More specifically, when applying the adhesive agent to the iron core laminates of the lower most layer (situated lower than the lowermost shaped iron core laminate 311) of the laminated iron core 19 (including the annular laminates 312 and pole laminates 313), the adhesive agent is ejected from the ejection orifices H1 and H3 while interrupting the operation of the dispenser 81B (or the ejection of the adhesive agent from the ejection orifices H2). As a result, the adhesive agent is applied to the application spots E31 and E33 of the annular laminates 312 and the pole laminates 313, respectively. When applying the adhesive agent to the shaped iron core laminates 311, the adhesive agent is ejected from all of the ejection orifices H1 to H3 by operating all of the dispenser 81A to 81C. (or the ejection of the adhesive agent from the ejection orifices H1 to H3). As a result, the adhesive agent is applied to all of the application spots E31 to E33. When applying the adhesive agent to the iron core laminates of the uppermost layer (situated higher than the uppermost shaped iron core laminate 311) of the laminated iron core 19, similarly as was the case with the iron core laminates of the lowermost layer of the laminated iron core 19, the adhesive agent is ejected from the ejection orifices H1 and H3 while interrupting the operation of the dispenser 81B (or the ejection of the adhesive agent from the ejection orifices H2). As a result, the adhesive agent is applied to the application spots E31 and E33 of the annular laminates 312 and the pole laminates 313, respectively.

In the progressive metallic die machine 1 of the third embodiment, the control unit 85 may be configured such that the supply of the adhesive agent to at least one of the adhesive agent storage chambers is interrupted when the iron core laminates forming the laminated iron core change from one kind to another (except for when applying the adhesive agent to the uppermost or lowermost iron core laminate designated as the separation iron core laminate). Thereby, each group of the ejection orifices H1 to H3 is enabled to apply a required amount of adhesive agent depending on the size of the application area and the required bonding strength without any difficulty. In particular, the ejection orifices H1 to H3 are allocated to different application areas (the annular laminates 312, the shaped iron core laminates 311 and the pole laminates 313) so that a suitable amount of the adhesive agent can be applied for each of such application areas.

Fourth Embodiment

Figure 16:
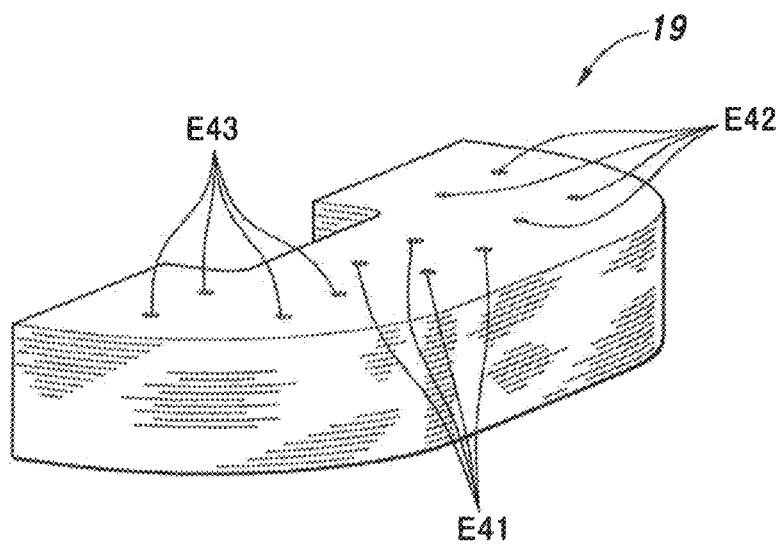
FIG. 16 is a perspective view of a laminated iron core of a fourth embodiment.
Figure 17:
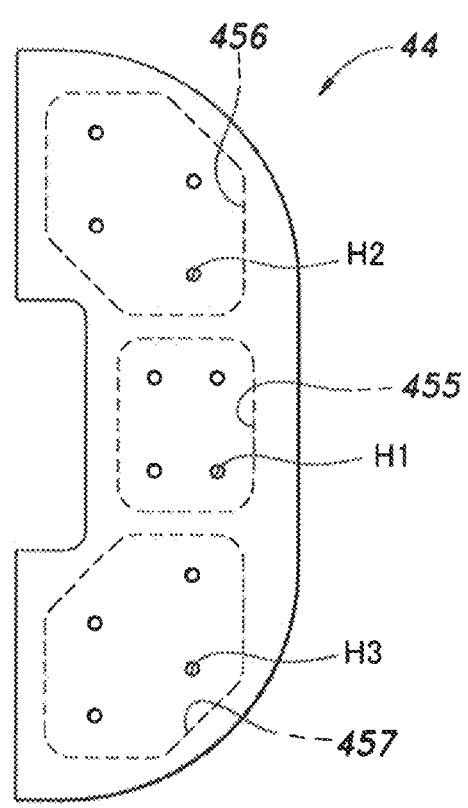
FIG. 17 is a plan view of a nozzle block of the fourth embodiment.

FIG. 16 is a perspective view of a laminated iron core of a fourth embodiment, and FIG. 17 is a plan view of a nozzle block of the fourth embodiment. The parts corresponding to those of any of the first to third embodiments are denoted with like numerals in FIGS. 16 and 17, and such parts may be omitted from the following description as they are similar to the counterparts of any of the first or third embodiment.

As shown in FIG. 16, in the fourth embodiment, the laminated iron core 19 consists of a U-shaped core typically used for current reacting reactors. In an adhesive agent application step (6) which is similar to the counterpart of the first embodiment, the adhesive agent is applied to a plurality (four, in the illustrated embodiment) of spots E41 arranged centrally, and a plurality (four, in the illustrated embodiment) of spots E42, E43 arranged on each lateral side of the centrally arranged application spots E41.

As shown in FIG. 17, the nozzle block 44 is configured for the application of the adhesive agent to an iron core laminate (see FIG. 16) having the shape of letter-U in plan view, and is provided with a plurality of ejection orifices H1 corresponding to the application spots E41, a plurality of ejection orifices H2 corresponding to the application spots E42, and a plurality of ejection orifices H3 corresponding to the application spots E43, all opening out at the upper surface of the nozzle block 44. Similarly as the first embodiment, the nozzle block 44 is internally provided with adhesive agent storage grooves (recesses) 455 to 457 defining spaces for temporarily storing the adhesive agent. The ejection orifices H1 communicate with the adhesive agent storage groove 455 having a rectangular shape and located under the ejection orifices H1. The ejection orifices H2 communicate with the adhesive agent storage groove 456 having a hexagonal shape in plan view and located under the ejection orifices H2. The ejection orifices H3 communicate with the adhesive agent storage groove 457 having a hexagonal shape in plan view and located under the ejection orifices H3.

In the fourth embodiment, similarly as the first embodiment, the control unit 85 causes the adhesive agent to the applied to the application spots E41 to E43 by controlling the operation of the dispensers 81A to 81C. The ejection orifices H1 to H3 have a same diameter, but by controlling the pressure of the adhesive agent supplied from the dispensers 81A to 81C, the amount of the adhesive agent supplied by each group of the ejection orifices H1 to H3 can be individually adjusted. In this case, the flow rate (the pressure of the adhesive agent storage grooves 456 and 457) of the adhesive agent that is supplied from the dispensers 81B and 81C to the relatively sparsely arranged ejection orifices H2 and H3 is selected to be greater than the flow rate (the pressure of the adhesive agent storage groove 455) of the adhesive agent supplied from the dispenser 81A to the ejection orifices H1.

Although the present invention has been described in terms of preferred embodiments thereof, it is obvious to a person skilled in the art that various alterations and modifications are possible without departing from the scope of the present invention. The adhesive agent storage chambers for the adhesive agent ejection units were formed as grooves in the foregoing embodiments, but may also consist of other structures as long as they can perform the function of the spaces for temporarily storing the adhesive agent to be ejected from the ejection orifices. The adhesive agent was applied to the sheet metal strip from the side of the lower metallic die assembly in the foregoing embodiments as preferred embodiments, but the present invention does not exclude the structures for applying the adhesive agent from the side of the upper metallic die assembly. Furthermore, according to the present invention, each application area (or each ejection orifice group) may be arranged freely by taking into account at least one of various factors such as whether the ejection orifices in each group have a same diameter (a same application amount), whether the ejection orifices are arranged densely (or close to one another), and whether the ejection of the adhesive agent from the ejection orifices of each group is interrupted at the same time. The components contained in or associated with the apparatus and method for manufacturing a laminated iron core are not entirely essential for the present invention, and may be partly omitted and substituted without departing from the spirit of the present invention.

Glossary of Terms 1 transfer metallic die machine (apparatus for manufacturing iron cores)
2 iron core laminate
3 upper metallic die assembly
4 lower metallic die assembly
10 stripper plate
12 adhesive agent application unit
15 iron core laminate stack
16 squeeze ring
17 rotary actuator
18 first heating unit
19 laminated iron core
21 second heating unit
31 adhesive agent ejection unit
32 adhesive agent supply unit
33 reciprocating drive unit
43 adhesive agent introduction block
44 nozzle block (casing)
47 support table
48A-48C manifold member (manifold)
55, 355 first adhesive agent storage groove (adhesive agent reservoir, first reservoir)
56, 356 second adhesive agent storage groove (adhesive agent reservoir, first or second reservoir)
57, 357 third adhesive agent storage groove (adhesive agent reservoir, second reservoir)
81A-81C dispenser
85 control unit
255, 455 first adhesive agent storage groove (adhesive agent storage chamber)
256, 456 second adhesive agent storage groove (adhesive agent storage chamber)
257, 457 third adhesive agent storage groove (adhesive agent storage chamber)
311 shaped iron core laminate (laminate segment)
312 annular iron core laminate (laminate segment)
313 pole iron core laminate (laminate segment)
H1-H3 ejection orifice
K1-K3 injection orifice
W sheet metal strip

The invention claimed is:

1. Apparatus for manufacturing a laminated iron core formed by laminating and bonding a plurality of iron core laminates that are each formed by blanking a sheet steel strip into a prescribed shape, comprising:
   an upper metallic die assembly and a lower metallic die assembly opposing each other so as to blank the iron core laminates from the sheet steel strip that is conveyed in an intermittent manner; and
   an adhesive agent application unit configured to apply an adhesive agent to a prescribed area of the sheet steel strip corresponding to the iron core laminates;
   wherein the adhesive agent application unit is provided with a casing defining a plurality of adhesive agent storage chambers for storing the adhesive agent before the adhesive agent is applied to the prescribed area;
   wherein the casing is provided with a plurality of ejection orifices each communicating with a corresponding one of the adhesive agent storage chambers and configured to eject the adhesive agent, and
   wherein the laminated iron core is formed by iron core laminates including an annular or a circular section, and the adhesive agent storage chambers include at least a first storage chamber having an annular shape in plan view, and a second storage chamber having a larger annular shape in plan view and arranged concentrically to the first storage chamber.

2. The apparatus for manufacturing a laminated iron core according to claim 1, further comprising a control unit for controlling supply of the adhesive agent to the adhesive agent storage chambers individually.

3. The apparatus for manufacturing a laminated iron core according to claim 2, wherein the control unit is configured to interrupt supply of the adhesive agent to at least one of the adhesive agent storage chambers when applying the adhesive agent to a prescribed area corresponding to at least one of the iron core laminates that form the laminated iron core.

4. The apparatus for manufacturing a laminated iron core according to claim 3, wherein the laminated iron core is formed by a plurality of kinds of iron core laminates having different profiles, and the control unit is configured to interrupt supply of the adhesive agent to at least one of the adhesive agent storage chambers such that when the iron core laminates corresponding to the prescribed area are changed from one kind to another, the adhesive agent is applied only to a area where the iron core laminate of the one kind overlaps with the iron core laminate of the other kind.

5. The apparatus for manufacturing a laminated iron core according to claim 3, wherein the laminated iron core is formed by iron core laminates each including a plurality of segments, and the control unit is configured to interrupt supply of the adhesive agent to at least one of the adhesive agent storage chambers such that when the iron core laminates corresponding to the prescribed area are changed from one kind to another, the adhesive agent is applied to a area where the iron core laminate of the one kind overlaps with the iron core laminate of the other kind.

6. The apparatus for manufacturing a laminated iron core according to claim 1, wherein ejection orifices communicating with different ones of the adhesive agent storage chambers have mutually different diameters.

7. The apparatus for manufacturing a laminated iron core according to claim 1, wherein the adhesive agent in one of the adhesive agent storage chambers has a pressure which is different from that of the adhesive agent in a different one of the adhesive agent storage chamber.

8. The apparatus for manufacturing a laminated iron core according to claim 1, wherein an amount of application from each ejection orifice communicating with the second storage chamber is greater than an amount of application from each ejection orifice communicating with the first storage chamber.

9. The apparatus for manufacturing a laminated iron core according to claim 8, wherein a diameter of each ejection orifice communicating with the second storage chamber is greater than a diameter of each ejection orifice communicating with the first storage chamber.

10. The apparatus for manufacturing a laminated iron core according to claim 8, wherein a pressure of the adhesive agent in the second storage chamber is greater than a pressure of the adhesive agent in the first storage chamber.

11. The apparatus for manufacturing a laminated iron core according claim 1, wherein at least one of the first and second storage chambers is provided with a plurality of injection orifices for injecting the adhesive agent into the at least one of the first and second storage chambers, and the apparatus further comprises a manifold including a plurality of branch passages connected to the respective injection orifices.

12. The apparatus for manufacturing a laminated iron core according to claim 11, wherein the casing is annular in plan view, and the manifold is positioned centrally with respect to the casing in plan view.

13. The apparatus for manufacturing a laminated iron core according to claim 12, wherein the manifold is provided for each of the first and second storage chambers, and the two manifolds are positioned one above the other.

* * * * *